United States Patent
Bracholdt et al.

(10) Patent No.: US 11,487,721 B2
(45) Date of Patent: Nov. 1, 2022

(54) MATCHING METASTRUCTURE FOR DATA MODELING

(71) Applicant: SAP SE, Walldorf (DE)

(72) Inventors: Sandra Bracholdt, Dielheim (DE); Joachim Gross, Altrip (DE); Volker Saggau, Bensheim (DE); Jan Portisch, Bruchsal (DE)

(73) Assignee: SAP SE, Walldorf (DE)

( * ) Notice: Subject to any disclaimer, the term of this patent is extended or adjusted under 35 U.S.C. 154(b) by 687 days.

(21) Appl. No.: 16/399,533

(22) Filed: Apr. 30, 2019

(65) Prior Publication Data
US 2020/0349130 A1    Nov. 5, 2020

(51) Int. Cl.
| | | |
|---|---|---|
| *G06F 16/20* | (2019.01) | |
| *G06F 16/21* | (2019.01) | |
| *G06F 16/28* | (2019.01) | |
| *G06F 16/25* | (2019.01) | |
| *G06F 16/22* | (2019.01) | |

(52) U.S. Cl.
CPC ........ *G06F 16/213* (2019.01); *G06F 16/2282* (2019.01); *G06F 16/254* (2019.01); *G06F 16/284* (2019.01)

(58) Field of Classification Search
CPC .. G06F 16/213; G06F 16/2282; G06F 16/254; G06F 16/284
See application file for complete search history.

(56) References Cited

U.S. PATENT DOCUMENTS

| | | | |
|---|---|---|---|
| 5,873,093 A | * | 2/1999 | Williamson ........ G06F 16/2438 707/999.102 |
| 7,506,324 B2 | | 3/2009 | Thiagarajan et al. |
| 7,877,421 B2 | * | 1/2011 | Berger .................... G06F 16/25 707/975 |
| 7,934,207 B2 | | 4/2011 | Gustafsson et al. |
| 8,370,233 B2 | | 2/2013 | Kaisermayr et al. |
| 8,788,931 B1 | | 7/2014 | Chen et al. |

(Continued)

OTHER PUBLICATIONS

Office Action received in related U.S. Appl. No. 16/265,063, dated Nov. 5, 2020, 25 pages.

(Continued)

*Primary Examiner* — Kristopher Andersen
(74) *Attorney, Agent, or Firm* — Klarquist Sparkman, LLP

(57) ABSTRACT

A metastructure for representing and manipulating or analyzing a data model is provided herein. A source representation of the first data model may be received. The source representation may include a representation of one or more structural components of the first data model, respectively having identifiers and types. One or more instances of a metastructure schema object datatype may be generated based on the one or more structural components of the source representation. Generating a given instance of the metastructure schema object datatype for a given structural component may include assigning a first identifier of the given structural component to the first data member of the given instance, determining a first type associated with the given structural component, and assigning the first type to the second data member of the given instance. The one or more instances of the metastructure schema object datatype may be stored in association.

27 Claims, 20 Drawing Sheets

(56) References Cited

U.S. PATENT DOCUMENTS

| | | | |
|---|---|---|---|
| 2007/0005630 | A1 | 1/2007 | Selca et al. |
| 2007/0038651 | A1* | 2/2007 | Bernstein ............... G06F 16/28 |
| 2008/0140689 | A1 | 6/2008 | Chen et al. |
| 2009/0248586 | A1 | 10/2009 | Kaisermayr et al. |
| 2010/0070500 | A1 | 3/2010 | Cui et al. |
| 2012/0166459 | A1 | 6/2012 | Ritter et al. |
| 2013/0111381 | A1 | 5/2013 | Ritter et al. |
| 2013/0138597 | A1 | 5/2013 | Kyle |
| 2013/0166495 | A1 | 6/2013 | Kazmaier et al. |
| 2013/0179772 | A1 | 6/2013 | Nakamura |
| 2016/0321307 | A1 | 11/2016 | Digman et al. |
| 2016/0357787 | A1 | 12/2016 | Kolata et al. |
| 2016/0371117 | A1 | 12/2016 | Mishra et al. |
| 2018/0081938 | A1 | 3/2018 | Khuong et al. |
| 2019/0034482 | A1 | 1/2019 | Werner et al. |
| 2019/0303207 | A1 | 10/2019 | Vadapandeshwara et al. |
| 2019/0384836 | A1 | 12/2019 | Roth et al. |
| 2020/0233877 | A1 | 7/2020 | Patel et al. |
| 2020/0250260 | A1 | 8/2020 | Portisch et al. |
| 2021/0012219 | A1 | 1/2021 | Portisch et al. |
| 2021/0073196 | A1 | 3/2021 | Schub et al. |
| 2021/0073655 | A1 | 3/2021 | Portisch et al. |
| 2021/0357577 | A1 | 11/2021 | Portisch et al. |

OTHER PUBLICATIONS

Notice of Allowance received in U.S. Appl. No. 16/265,063, dated May 3, 2021, 9 pages.

Office Action received in U.S. Appl. No. 16/564,365, dated Aug. 19, 2021, 12 pages.

"Binary tree," Wikipedia, available at: https://en.wikipedia.org/wiki/Binary_tree, 7 pages, page last updated Jul. 2, 2019, retrieved on Aug. 20, 2019.

"Probability Tree Diagrams," https://www.mathsisfun.com/data/probability-tree-diagrams.html, 5 pp.

"Scratch (programming language)," Wikipedia, visited Jan. 31, 2019, 13 pages.

Blumöhr et al., "Variant Configuration with SAP," retrieved from https://www.sap-press.com/variant-configuration-with-sap_2889/ on or before Jan. 2018, 52 pp.

Gulwani, S. et al., "Program Analysis as Constraint Solving," retrieved from https://www.microsoft.com/en-us/research/wp-content/uploads/2016/12/pldi08_cs.pdf on or before Jan. 2018, 12 pp.

Hauptmann, "Introduction to Variant Configuration with an example model," retrieved from https://wiki.scn.sap.com/wiki/display/PLM/Introduction+to+Variant+Configuration +with+an+example+model on or before Jan. 2018, 11 pp.

Kumbum, R., "Variant Configuration," retrieved from https://www.slideshare.net/KUMBUM/sap-variant-configuration-34736665 on or before Jan. 2018, 84 pp.

Lecoutre, C. et al., "Improving the lower bound of simple tabular reduction," retrieved from https://link.springer.com/article/10.1007/s10601-014-9171-9 on or before Jan. 2018, 9 pp.

Lecoutre, C., "STR2: optimized simple tabular reduction for table constraints," retrieved from https://link.springer.com/article/10.1007/s10601-011-9107-6 on or before Jan. 2018, 31 pp.

Li, H. et al., "Making Simple Tabular Reduction Works on Negative Table Constraints," retrieved from https://pdfs.semanticscholar.org/8057/f234d2f1b3591cffeb8d651e15e1043fd78d.pdf on or before Jan. 2018, 2 pp.

Marriott, K. et al., "Negative Boolean constraints," retrieved from https://www.sciencedirect.com/science/article/pii/030439759500209X on or before Jan. 2018, 16 pp.

Ullmann, J., "Partition search for non-binary constraint satisfaction," retrieved from http://cse.unl.edu/~choueiry/Documents/Ullmann2007-GAC.pdf on or before Jan. 2018, 40 pp.

Wallace, M., "Practical Applications of Constraint Programming," retrieved from https://link.springer.com/article/10.1007/BF00143881 on or before Jan. 2018, 30 pp.

Notice of Allowance received in U.S. Appl. No. 16/564,365, dated Jan. 19, 2022, 10 pages.

Fan et al., Transformation of Relational Database Schema to Semantics Web Model, 2010 Second International Communications Systems, Networks and Applications, pp. 379-384, 2010.

Non-Final Office Action received in U.S. Appl. No. 17/387,217, dated May 11, 2022, 16 pages.

Office Action received in U.S. Appl. No. 16/507,465, dated Jun. 30, 2022, 59 pages.

Office action received in U.S. Appl. No. 16/567,470, dated Jul. 14, 2022, 64 pages.

Notice of Allowance received in U.S. Appl. No. 17/387,217, dated Aug. 5, 2022, 7 pages.

* cited by examiner

RULE DEFINITION rule_3: rule_1 AND rule_2
RULE DEFINITION rule_1: OBJ_1 > 0.5
RULE DEFINITION rule_2: OBJ_2 = 'Volker'

510
└─ RULE DEFINITION rule_3: (OBJ_1 > 0.5) AND (OBJ_2 = 'Volker')

520
┌─ RULE DEFINITION rule_3: IF {
        OBJ_1 > 0.5;
        IF {
            OBJ_2 = 'Volker';
        }
   }

710 —▶

714 DATA OBJECT DEFINITION: OBJ_1, OBJ_2, OBJ_3, OBJ_4
716 RULE DEFINITION rule_1: OBJ_1 = 'Value1'
716 RULE DEFINITION rule_2: OBJ_2 > 5.5
716a RULE DEFINITION rule_3: rule_1 AND rule_2
716 RULE DEFINITION rule_4: OBJ_3 = 'SWAP'
716 CONSEQUENCE DEFINITION consequence_1: rule_3 -> OBJ_4 = 'CAT_A'      722a
722b CONSEQUENCE DEFINITION consequence_2: rule_4 -> OBJ_4 = 'CAT_B'
MAPPING DEFINITION mapping_1: consequence_1, consequence_2      726

712 ↪

730 SELECT "consequence"
FROM
( 734 SELECT
    CASE
    WHEN
      "OBJ_3" = 'SWAP'
    THEN 'CAT_B'
    END as "consequence"
    FROM <hana_data_source_1>
)
UNION
( 738 SELECT
    CASE
    WHEN
      "OBJ_1" = 'Value1'
    AND
      "OBJ_2" > 5.5
    THEN 'CAT_A'
    END as "consequence"
    FROM <hana_data_source_1>
)
LIMIT 1    742

FIG. 7

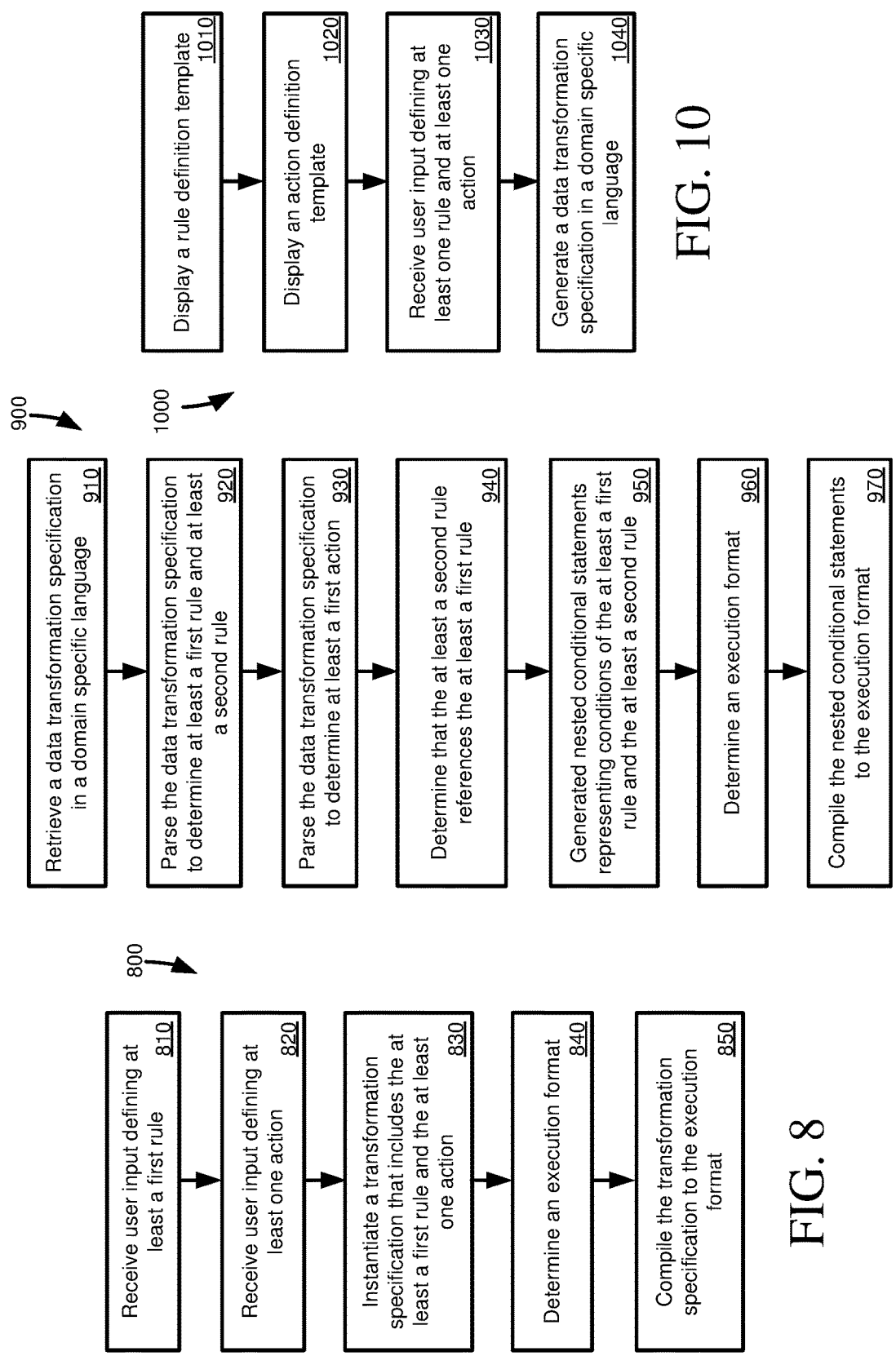

MATCHING METASTRUCTURE FOR DATA MODELING

FIELD

The present disclosure generally relates to data model structuring and data model analysis. Particular implementations relate to metastructures for data models such as database schemas, and systems and methods for converting data models to a common metastructure and analyzing data models converted to a common metastructure, such as for database mapping or clustering.

BACKGROUND

Enterprise data models and database schemas are often very large and very complex, and may consist of thousands of entities, attributes, and relations among the entities and attributes. Further, entities often use multiple data models across many different systems. Because of this complexity and the wide usage of different data models in varying systems, it is often very difficult to make systems interoperable or to develop or maintain consist information about correlations between these complex data models. This problem is made worse when the data model is undocumented or poorly documented, which is often the case. Such a lack of understandable information makes many tasks using the data model difficult, such as system integration or matching the model to other data models. The analysis of large enterprise data models and schemas is often done by domain experts or consultants, and is very labor-intensive and costly. Thus, there is room for improvement.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A method for generating a metadata representation of a first database model. The method may be implemented by one or more computing devices comprising at least one hardware processor and one or more tangible memories coupled to the at least one hardware processor.

A source representation of the first database model may be received. The source representation may include a representation of at least a first database table including at least a first column, the first database table representation including at least a first identifier for the at least first database table and at least a second identifier for the at least first column.

A first instance of a metastructure schema object datatype may be generated based on the first database table representation. The metastructure schema object datatype may include a first data member representing an identifier for a database object represented by an instance of the metastructure schema object datatype and a second data member representing a database object type associated with the database object. Generating the first instance of the metastructure schema object datatype may include assigning the first identifier of the first database table to the first data member of the first instance. Generating the first instance of the metastructure schema object datatype may include determining that the first identifier is associated with a database table. Generating the first instance of the metastructure schema object datatype may include assigning a type identifier to the second data member of the first instance indicating that the first instance represents a database table.

A second instance of the metastructure schema object datatype may be generated based on the first column representation. Generating the second instance of the metastructure schema object datatype may include assigning the second identifier of the first column to the first data member of the second instance. Generating the second instance of the metastructure schema object datatype may include determining that the second identifier is associated with a column of a database table. Generating the second instance of the metastructure schema object datatype may include assigning a type identifier to the second data member of the second instance indicating that the second instance represents a column of a database table.

The first instance of the metastructure schema object datatype and the second instance of the metastructure schema object datatype may be stored in association.

A method for maintaining data model mappings is provided herein. A first data model may be received. The first data model may include one or more structural components and one or more relationships between structural components. A first data schema for the first data model may be generated. The first data schema may include a set of schema objects corresponding to the one or more structural components of the first data model. A given schema object may include a schema object identifier and a structural component identifier. The first data schema may include a set of relationship objects corresponding to the one or more relationships in the first data model. A given relationship object may include a relationship object identifier, a first schema object identifier, and a second schema object identifier.

A second data model may be received. The second data model may include one or more second structural components and one or more second relationships between second structural components. A second data schema for the second data model may be generated. The second data schema may include a second set of schema objects corresponding to the one or more second structural components of the second data model. A given second schema object may include a second schema object identifier and a second structural component identifier. The second data schema may include a second set of relationship objects corresponding to the one or more second relationships in the second data model. A given second relationship object may include a second relationship object identifier, a third schema object identifier, and a fourth schema object identifier.

One or more mappings between the first data model and the second data model may be received. A data schema alignment may be generated for the first data model and the second data model. The data schema alignment may include a set of alignment mappings based on the one or more received mappings. A given alignment mapping may include identifiers for one or more schema objects from the first data model and an identifier for a schema object in the second data model.

A method for generating a metadata representation of a first data model is provided herein. The method may be implemented by one or more computing devices comprising at least one hardware processor and one or more tangible memories coupled to the at least one hardware processor.

A source representation of the first data model may be received. The source representation may include a representation of one or more structural components of the first data model, respectively having identifiers and types. One or more instances of a metastructure schema object datatype may be generated based on the one or more structural components of the source representation. The metastructure schema object datatype may include a first data member representing an identifier for a structural component represented by an instance of the metastructure schema object datatype and a second data member representing a structural component type for a structural component represented by an instance of the metastructure schema object datatype.

Generating a given instance of the metastructure schema object datatype for a given structural component may include assigning a first identifier of the given structural component to the first data member of the given instance. Generating a given instance of the metastructure schema object datatype for a given structural component may include determining a first type associated with the given structural component. Generating a given instance of the metastructure schema object datatype for a given structural component may include assigning the first type to the second data member of the given instance.

The one or more instances of the metastructure schema object datatype may be stored in association.

The foregoing and other objects, features, and advantages of the invention will become more apparent from the following detailed description, which proceeds with reference to the accompanying figures.

BRIEF DESCRIPTION OF THE DRAWINGS

FIG. 7 illustrates how a data transformation specification in a domain specific language can be converted to an executable specification or format, such as SQL code as shown.

FIG. 8 is a flowchart of a disclosed method of compiling a transformation specification in a domain specific language to an execution format.

FIG. 9 is a flowchart of a disclosed method that can be carried out by a domain specific language compiler.

FIG. 10 is a flowchart illustrating operations in a disclosed embodiment of rendering a data transformation specification user interface.

DETAILED DESCRIPTION

Figure 1:
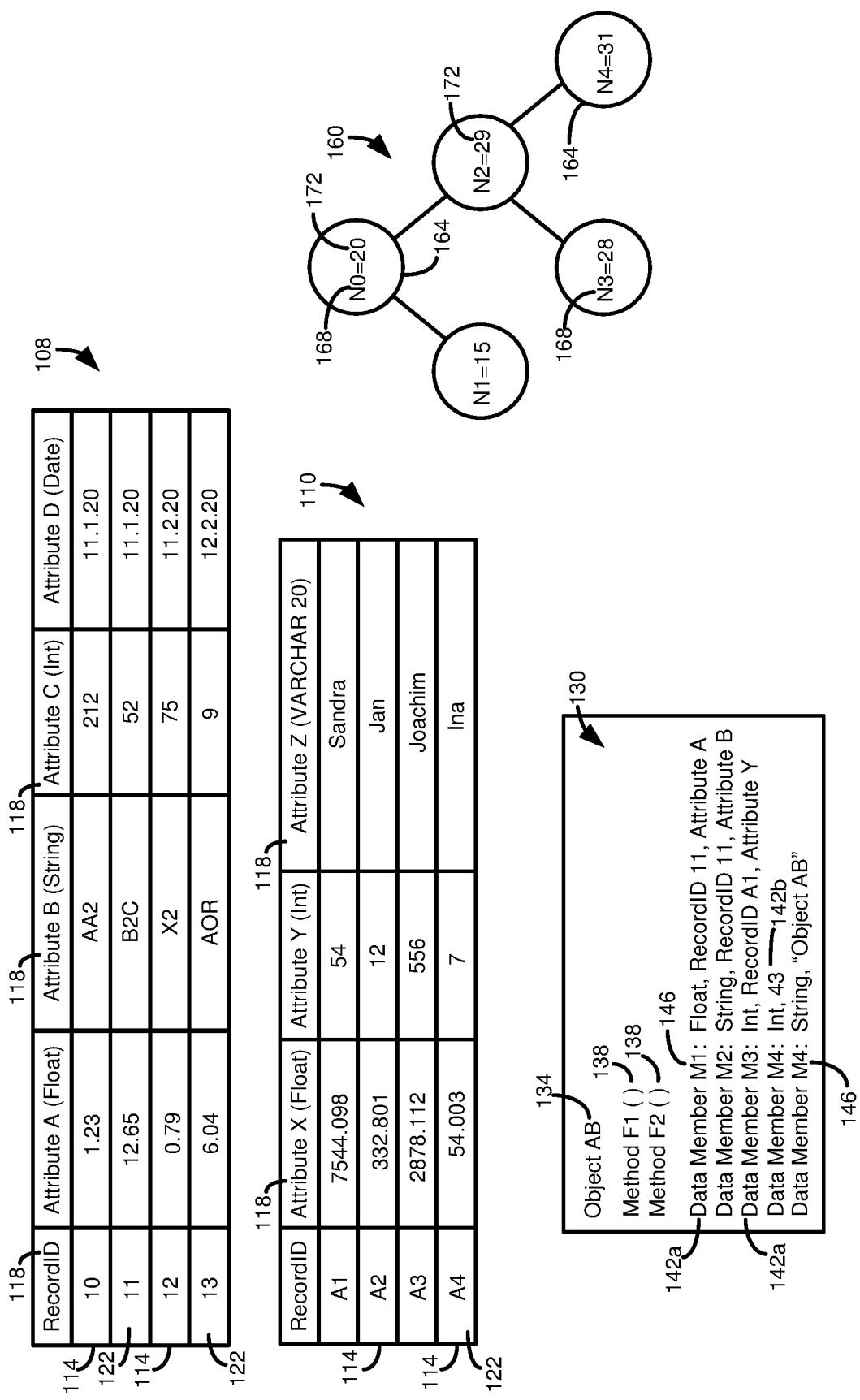
FIG. 1 is a diagram illustrating various data targets that may be used with recursive rules language technologies.

A variety of examples are provided herein to illustrate the disclosed technologies. The technologies from any example can be combined with the technologies described in any one or more of the other examples to achieve the scope and spirit of the disclosed technologies as embodied in the claims, beyond the explicit descriptions provided herein. Further, the components described within the examples herein may be combined or recombined as well, as understood by one skilled in the art, to achieve the scope and spirit of the claims.

Example 1—Data Model Matching Metastructure Overview

Entities often run many different data-driven applications from different providers. Such disparate applications often have their own data models, but these different data models may work on the same or similar data, at least in part. Even applications from the same provider may have different data models. Where the different data models utilize different data, their systems may need to be integrated together for improved performance or efficiency across the entity, or to facilitate yet further applications that may use data models of multiple applications, such as analytic or data visualization applications. Failure to integrate such systems and their data models may create data silos (e.g. non-integrated data storage), which may have a detrimental effect.

For example, data silos may prevent common information from being broadly available within the entity, which may limit the ability to effectively use the data the entity has. Operating two separate data silos covering the same or similar data may lead to violations of data integrity, such as by having different information covering the same topic because one system (data silo 1) was updated while the other system (data silo 2) was not. This can lead to significant performance failures in the entity, because there is no "true" or "accurate" common view of the entity's data. Further, procedures that attempt to ensure compliance with data regulations (such as regarding sensitive or personally identifying information) may be difficult to efficiently or accurately implement across multiple data silos.

Accordingly, avoiding data silos and integrating data may overcome these issues, such as when multiple data-driven applications are in use. Data model matching, such as mapping or aligning a data model with another data model, generally improves data integration across disparate systems. However, data model matching is generally expensive and labor-intensive, and can require a detailed understanding of the data models.

Additionally, there are many other scenarios where a thorough understanding of a data model is important to effectively or efficiently accomplish data integration. For example, when analyzing a new data model for acquisition or upgrade, quickly understanding the data model to determine if it meets basic requirements is important. As another example, ETL (extract, transform, load) processes often migrate or move data from one database to another database, such as a part of system updates, database synchronizing, or data provisioning, and generally requires a good understanding of the data models involved. Another example is when configuring an environment to house a database system, which generally requires an understanding of which components in a data model are closely related to which other components. In yet another example, a collaboration between different people or businesses may lead to a shared database system, which may require consolidation of data from their respective database systems. Or, database system integration, where separate database systems from the different people or businesses communicate with each other, can require a thorough understanding of the data models. In all such examples, a thorough and conceptual understanding of the databases can facilitate efficient and effective use of the data models or databases. Automating such tasks or analysis of the data models or database schemas may be beneficial, but can be difficult without a common framework for the data models.

As a more detailed example, an entity may acquire a standard data model for use in integrating its current multiple databases (or different applications using a common database, but having data stored in different schemas), including as part of transitioning to a new or updated database software. However, the standard data model may be complex, as well as the multitude of currently operating databases data models. For example, database schema for ERP systems often include thousands of tables, where each table can include many different fields. The tables and fields can be interrelated, and the schema can be even more complex to analyze given that the tables and fields often do not have names that are easily understood by humans. The current databases should be mapped to the new standard database to integrate the systems, which may require multiple consultants and experts to spend significant amounts of time performing the labor-intensive task of analyzing the new data model and the multitude of current databases to align them with the new data model. Further, the consultants and experts may not know where to start, or how to efficiently document, the data model mapping between the new data model and each of the current databases or schemas. A lightweight and standardized method or format, such as the matching metastructure technologies disclosed herein, generally makes mapping data models much easier and faster, while being less costly and less labor-intensive, because consistency in format generally increases efficiency, such as by allowing re-use of work, and may be automated or semi-automated.

Continuing the detailed example above relating to potential issues with prior approaches to integrating databases/schemas, the entity may form several teams to perform the mapping process between the new data model and the current databases. However, each team may have a different approach to identifying and recording the mappings. For example, the first team may be composed of IT experts that plan to write SQL functions for mapping the data from a current database to the new database of the new data model. A second team may be composed of IT consultants that propose using a "well-matured" spreadsheet for tracking the mappings. A third team may be composed of subject matter experts that prefer to simply write basic data mapping statements, such as first order logic statements in natural language. A lightweight and standardized method or format may make integrating each teams' efforts easier and more cost-effective because each team may then generate results (mappings) that can readily be integrated together.

As another detailed example, a consultant focusing on data integration projects may develop templates, such as text documents or spreadsheets, for carrying out data model mapping tasks, such as maintaining or tracking mappings. However, over time the mapping tasks become increasingly difficult and complicated, as source data model structures change, target data model structures change, and the mappings (with any associated transformations) are persisted in permanently extended, corrected, and changed documents. A common format and methodology may generally reduce the overhead work in maintaining a large set of mapping documentation.

As yet another detailed example, a consultant or data scientist working on several data model integration projects may seek to analyze the data model mappings across many different systems to find patterns that may improve the mapping process. However, the data models and mappings may all be maintained in heterogeneous formats, with little or no standardization across integration projects. Without a common format or method for understanding data models and mappings, such broad analysis may not be possible, or may be prohibitively costly or labor-intensive. A common format and methodology may facilitate such detailed analyses of data model mappings across a wide variety of data models and data model integration projects.

The matching metastructure technologies disclosed herein provide such a common or standardized framework for understanding, analyzing, comparing, or mapping data models, and persisting the data models in association with their mappings. The matching metastructure may be a versatile or universal definition or format for a data model, or for modelling a data model. The matching metastructure therefore facilitates integrating data models by facilitating analysis or comparison between disparate data models. Generally, the matching metastructure provides concisely defined terminology and representation for data models, which facilitates automatic analysis and comparison across data models, such as data model clustering or data model alignment or mapping. Further, the matching metastructure may provide an efficient format for storing and retrieving data models. Additionally, the matching metastructure may facilitate efficient and consistent (and thereby, accurate) lifecycle management of data models and associated data model analysis or metadata (e.g. mappings). The matching metastructure is an open, generic format and methodology, and so is not limited to a particular format or type of data model, but is instead versatile in its applicability to and effectiveness for data models. Further, the matching metastructure is an extensible model, allowing for flexibility in adapting to new data models or additional features for representing or analyzing data models.

A data model may be an abstract model which may organize elements of data and standardize how they relate to one another and to properties of real world entities. A data model may be a conceptual data model, broadly defining elements, or a physical data model, specifically defining an implementation structure (e.g., definitions of specific database objects, such as database tables or views, in a specific programming language or database implementation, including definitions of relationships between such specific objects). A data model may be a schema, such as a database schema. A data model or schema may be represented as a graph, as described herein.

Matching metastructure functionality may be provided in data modelling software, database analytics software, database management software, ERP software, or other data model- or database-driven software systems (or as a standalone system). Examples of such tools are: SAP FSDP™, SAP FSDM™, SAP PowerDesigner™, SAP Enterprise Architect Designer™, SAP HANA™, S/4HANA™, C/4 HANA™, HANA Native Data Warehouse™, all by SAP SE of Walldorf, Germany.

The present disclosure begins with a description of a recursive rules language, and how recursive rules may be implemented for transforming data from one data model to another data model (e.g. databases) based on a data model alignment or mappings, in Examples 2-10. Examples 1 and 11-16 describe disclosed technologies that facilitate data model conversion, analysis, mapping, and persistence in the matching metastructure.

Example 2—Recursive Rule Language Overview

As computers become more pervasive, integrating data from, or converting data between, different sources can become more complex. For example, it may be desired to use data from different sources in a common application, but the data may be stored in different formats, or using a different schema. Or, it may be desired to migrate data to a new format. Altering data values, or metadata associated with the data values (including a schema used to describe or process the data values) can be cumbersome, as it can require technical knowledge in understanding an initial format and schema of the data, a final, desired format and schema, and how to convert the data from the initial format and schema to the final format and schema.

A user's technical knowledge may determine tools that the user prefers to express how data should be arranged or changed, such as using first order logic statements (e.g., non-technical descriptions of the desired changes), spreadsheets, or actual code (for example, SQL statements). Having different users describe data transformations in different ways can create redundant work, and make it harder for the users to communicate. If team members leave, it may be difficult for new members to understand the prior member's work.

Transforming data may also require someone with a detailed understanding of the use or purpose of the data. As an individual with a detailed understanding of technical aspects of a data set is often not the same individual having a detailed semantic understanding of the data, difficulties can arise in transforming data values or metadata. Accordingly, room for improvement exists.

Often, it will be desired to alter a schema in which data is maintained, or to translate data between schemas. For instance, a user may wish to migrate to a new computing system or to a new software application from a legacy system or software application. In order to accomplish the migration, it may be necessary to migrate data from a legacy schema to a new schema. Or, it may be desired to use a data set with (or from) multiple software applications, but the software applications may use different data formats or schemas. As an example, a first database system may maintain a particular type of data in an attribute "A" of a first schema, and a second database system may maintain that type of data in an attribute "B" of a second schema. Even if the attributes have the same name (e.g., both are "A"), the values can be assigned using different schemas. For example, a first schema may assign values that represent categories as 1, 2, or 3, and a second schema may instead use A, B, or C. In addition, criteria for determining what category is assigned to a particular record may differ between the first schema and the second schema. The recursive rules language technologies can be used both to determine which data targets will be mapped (e.g., which data targets will be used to define a change to another data target), as well as what values will be assigned to the data target being modified.

Often, a non-technical user will create logical propositions that define how data values or metadata elements should be altered, such as using first order logic statements. These logical propositions can then be expressed in a spreadsheet, typically by more technically sophisticated users, but who still may not be users responsible for final programmatic implementation of a transformation. Eventually, the logical propositions, or spreadsheet representation, can be translated to a programming language, such as SQL (structured query language), to be implemented on an actual data set.

However, spreadsheet expressions of the logical propositions can vary significantly between users, and can be hard to understand, particularly when large numbers of propositions or rules exist. In addition, whether in a spreadsheet representation or in a programming language representation, it can be difficult to reuse results, or to modify rules if conditions change. For example, if a SQL implementation of a data transformation exists, and a particular schema change is added to, removed from, or modified in underlying logical statements, it may be necessary to re-implement the entire SQL code accomplishing a transformation. At the least, determining where/how to modify a programming language implementation of a data transformation can be complex and time consuming.

Such technologies provide a language (which can be referred to as Recursive Rule Language, or RRL) where first order logic statements can be defined and translated into a variety of implementable formats. Typically, the language is not a programming language, or otherwise does not specify operations that can be directly executed by a processor or particular software application. Such languages can be referred to as domain specific languages.

The logic statements can be simple to understand, reusable, and easy to modify. The logic statements can also refer to one another, in a sense being recursive. Accordingly, some or all of a data transformation can be implemented using an automated framework, where first order logic statements can be compiled into commands for a specific execution environment. Even if some aspects of a data transformation cannot, at least initially, be automatically implemented, the cost and time of accomplishing a data transformation, as well as the involvement of programmers or software developers, can be greatly reduced.

Such recursive rule language technologies provide a language for describing first order logic statements, which can be used to define conditions, or rules. The rules can define statements that can be tested for truth or falseness. The rules can include a building block, an operator, and another building block, where the building blocks serve as operands for the operator. Building blocks can be, for example, data targets, a value (e.g., a literal of a datatype, such as a particular value of a float, string, etc., including Boolean values such as TRUE or FALSE), or another rule. A data target can refer to a data structure that can be read from or written to, such as a logical pointer to a particular storage (e.g., memory or secondary storage) location or structure. The data target may have a label or identifier, such as the name of a column/attribute of a relational database table. In a particular example, the data target can be referenced by a URI for a particular data structure (e.g., the name or identifier of the data structure can in turn be mapped to a URI or logical pointer to the data structure, such as to an information schema or data dictionary). Locations (e.g., locations of specific data values or elements of a data target) can also be specified with respect to a particular data structure, such as a particular node of hierarchically arranged data elements (e.g., a graph, heap, or tree), or a particular index position of an array, queue, list, etc.

Actions can be defined, where an action can represent a specific value that is assigned to a data target when a particular rule evaluates to TRUE. For example, if a particular attribute has a particular name or identifier, the name or attribute can be changed to another value. Actions can be aggregated in a rule set or mapping, where a mapping includes a plurality of actions that are sequentially evaluated in a particular, specified order until an action of the mapping (e.g., a rule associated with a particular action) evaluates to true. When an action is determined to be executable, the process of evaluating actions in a given mapping for a given analysis (e.g., a particular application of a rule to a particular instance of rule building blocks) terminates.

In practice, a user can define data targets, rules, actions, and mappings in a language (or notation) that is programming-language independent. The rules, actions, and mappings can be expressed, however, using particular tokens, syntax, and semantics, so that the rules, actions, and mappings are expressed in a standardized manner. The standardized rules, actions, and mappings can then be automatically converted to a particular programming language or other executable format that can then be executed on one or more data sources. As an example, rules, actions, and mappings can be analyzed and automatically converted to one or more SQL statements (such as in a particular SQL dialect—for a particular database system) that can be executed on one or more database systems. Or, the elements of the transformation specification can be converted to scripted commands to cause a software application to perform a transformation.

If a user decides to add, modify, or remove particular rules, actions, or mappings, updated executable instructions can be automatically generated without the need to involve programmers or software developers. Because the elements of the transformation specification in the domain specific language are independent of a particular execution format, the rules, actions, and mappings can be more easily reused. For example, a variety of actions can be defined that use a particular rule without having to rewrite the rule. Similarly, various mappings can be created that include a particular action, without having to rewrite the action. In addition to being easy to reuse, the use of the programming language independent representation of first order logic statements, and other actions using such statements, can be easy to understand, including transformation specification elements that include relationships between multiple elements (e.g., recursively arranged rules, where a given rule references one or more additional rules, which in turn may reference one or more additional rules).

The ease of defining and implementing rules, actions, and mappings can also facilitate debugging efforts. For example, logic statements and other components can be checked for syntactic correctness as the statements are being developed, or otherwise prior to, or during, compilation to a particular executable format. Similarly, the ability to automatically generate executable code or commands can facilitate debugging efforts while rules are being developed, rather than having to wait until rules and other components for an entire data transformation specification have been implemented in a computer-executable format.

Example 3—Example Data Targets and Elements Thereof

FIG. 1 provides examples of data targets that can be used with the disclosed recursive rule language technologies. As discussed in Example 1, a data target can be a particular data structure that is capable of storing a plurality of data elements, typically of a particular data type. The data structure typically can be read from, written to, or both, and typically has metadata, such as a name or identifier that can be used to refer to or access the data structure, and optionally location information (e.g., a logical pointer) that can be used to access the data structure. In some cases, the location information can be explicit (e.g., a metadata field can store the location information), while in other cases the location information can be implicit (e.g., the data structure is in memory and a processor "knows" a memory location at which the data structure can be accessed based on the name or identifier of the data structure).

In some cases, a data structure can be "read only," such as when a value, for example an identifier, associated with a first data target (e.g., a name of the data structure, or a particular data element of the data structure) is used to determine whether and how a value should be changed for, or assigned to, a second data target. For example, the identifier of an attribute A might be accessed to determine that an attribute B should be changed to attribute C, but the identifier of attribute A may not be altered. Data targets referenced in actions typically are capable of both being read from and written to using the recursive rule language technologies. That is, if a data target corresponds to an attribute A of a database table, the identifier of attribute A, and optionally particular values held in the data structure of attribute A, can be read by a disclosed technology, and the identifier of the data structure can also be changed (e.g., changed from A to B). However, it is possible that some data targets need not be read by the recursive rule language technologies, but only written to.

FIG. 1 illustrates data targets in the form of components of relational database tables 108, 110. The tables 108, 110 can have rows or records 114 and columns or attributes 118. Each row 114 can be associated with an identifier 122, and can provide values for one or more (including all) of the attributes 118 for a given table. An attribute 118 can be associated with a particular datatype, such as a primitive datatype (e.g., integer, float, string, VARCHAR, or date).

The attributes 118 can correspond to particular data targets. A defined rule can analyze the identifier of the attribute, and optionally, values of particular data elements of the particular data target, to determine whether rule conditions are satisfied. Similarly, if the data target is defined with respect to an action, the action can determine what value is written for the data target and, in some cases, particular data elements of the data target type.

Particular data elements, such as a data element at a particular row/column location of a tables 108, 110 can be accessed in various manners, such as by identifying a record by its identifier 122 and the name of a particular attribute 118. That is, the identifier 122 can serve as a primary key for a given row 114. In other cases, one or more attributes 118 can serve as a primary key for a row 114. A table 108, 110 may have more than one attribute or combination of attributes that can serve to uniquely identify a given row 114 (e.g., a table may have a primary key and multiple other super keys).

Data elements of a data target, such as the tables 108, 110, can be referenced in other ways, such as using logical pointers to discrete attributes 118 or row/column locations, or using URIs to access a particular table attribute or value. For example, a table 108, 110 can be represented as a two-dimensional array, and particular index positions can be used to access particular rows, particular columns, or particular row/column locations.

FIG. 1 also illustrates data targets in the form of an instance of an abstract data type 130. The abstract data type instance 130 can have an identifier (e.g., a "name" of a variable, or instance, of the datatype) 134, optionally one or more methods 138, and one or more data members 142 (shown as data members 142a, 142b), each of which can be associated with an identifier 146, and can correspond to a data target. The identifiers 146 can be used to refer to the corresponding data target. All or a portion of the data members 142, such as data members 142a, can be mapped to values in another data target, such as row/column locations of a table 108, 110. Other data members 142b can have data targets that are defined in the instance 130, not with reference to another data target or other data source. The data members 142 can be accessed by referencing the instance identifier 134 and the relevant data member identifier 146.

A tree 160 is provided as another example of a data target formed from a collection of data elements. The tree 160 includes a plurality of hierarchically arranged nodes 164. Each node 164 can have a node identifier 168 and can store at least one value 172. In at least some cases, the value 172 of a node 164 for read or write purposes can be accessed by specifying the node identifier 168. In other cases, the appropriate node 164 can be located in another manner, such as by specifying a current value 172 of the node. That is, the tree 160 can be defined in such a way that a given value 172 can be located by suitably traversing the tree. Similar considerations can apply for reading or writing values in another type of data structures (e.g., stacks, queues, lists, heaps, or graphs).

Typically, particular data targets (e.g., the attributes 118 or data member identifiers 146) can be analyzed to determine whether they meet particular criteria, such as having a particular value that satisfies one or more rules (e.g., having an attribute or data member name that matches the rule criteria). In some cases, particular data elements of a data target can be analyzed to determine whether they meet the rule criteria (e.g., if rows of a table have attribute values that satisfy the criteria). If the particular criteria are met, a value associated with another specific data target type can be modified (e.g., if an attribute has a specified value, another attribute, which can be for a data target instance being analyzed, can be assigned a particular value, such as values for a first attribute being analyzed and used to assign values of A or B to a second attribute, depending on the values). As an example, in SQL, a rule can be defined to select data values meeting first criteria for a first data target identifier and to map the values to a new identifier.

Example 4—Example Elements of a Data Transformation Specification

Figure 2:
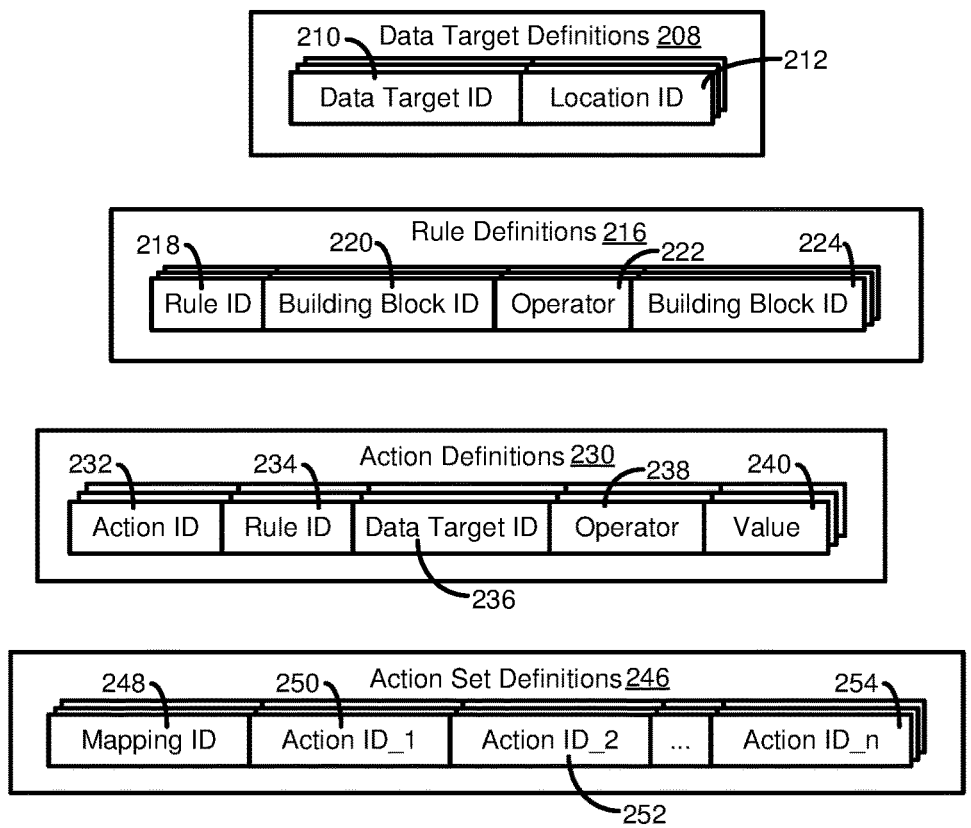
FIG. 2 is a diagram illustrating definition formats for various components of a data transformation specification.

FIG. 2 illustrates examples of how data targets, rules, actions, and rule sets (or mappings) can be defined in a particular programming language-independent representation, such as a domain specific language. Data target definitions 208 can include a data target identifier 210 and a location identifier 212. The data target location identifier 212 can be information sufficient to access (e.g., read, write, or both read and write access) a value associated with the data target, such as an identifier for the data target in a schema, and which in at least some cases can also be used for reading values associated with instances of the data target or writing a value for instances of the data target. That is, the data target location identifier 212 can serve as a logical pointer to values (including metadata values) associated with the data target identifier 210. In particular examples, the data target location identifier 212 can be a URI or a file path, such as to a schema or data dictionary definition of the data target (e.g., a path to the name of the data target in an information schema or a data dictionary).

In some cases, the data target location identifier 212 can be omitted, at least for purposes of defining a data transformation specification. For example, a data target can be created that will hold a value assigned by a particular action (as described herein). The data target can later be mapped to a data target location identifier 212, such as a location identifier for a particular schema element, such as an attribute name in a database schema.

Language elements can be provided to declare data targets. For example, the following statement declares data target "OBJ_1" and data target "OBJ_2":
DATA OBJECT DEFINITION: OBJ_1, OBJ_2
The above definition defines two data objects (or data targets) which can later be tested for particular values using rules, as described below. OBJ_1 and OBJ_2 can be used to refer to particular attributes of one or more tables of a relational database system, in a particular implementation. That is, a table may have an attribute with the name "OBJ_1."

Rule definitions 216 can include a rule identifier 218 that can be used to access or identify a given rule. Each rule can have the form <building block> <operator> <building block>, in a particular implementation. As shown in FIG. 2, an implementation of this format is shown as each rule identifier 218 being associated with a first building block ID 220, an operator 222, and a second building block ID 224. A building block, such as building blocks 220, 224, can be selected from a data target, a literal (e.g., a particular value of a particular datatype, including Boolean values), or another rule. Operators can include, for example, operators such as equality, greater than, less than, greater than or equal to, less than or equal to, OR (logical or), AND (logical and), or XOR. Operators may also be negated (e.g., NOT, !), in particular implementations. According to an example rule definition syntax, example rule definitions include:
RULE DEFINITION rule_1: OBJ_1='Category A'
RULE DEFINITION rule_2: OBJ_2>5.5
RULE DEFINITION rule_3: rule_1 AND rule_2
When the above rules are executed, particular schema elements, and values associated therewith, can be tested for rule compliance. For example, OBJ_1 and OBJ_2 can be particular database columns, and values in these columns can be evaluated to determine if the rules are satisfied for such values. From the above examples, it can be seen that rules can be recursive, in that a given rule can be defined with reference to other rules.

Action (or consequence) definitions 230 can include an action identifier 232 that can be used to access or identify a given action. Each action can have the form <rule> <data target> <operator> <value>, shown in FIG. 2 respectively as 234, 236, 238, 240. The operator 238 is typically the assignment operator. According to an example action definition syntax, an example action definition is:

CONSQUENCE DEFINITION consequent_1: rule_1→OBJ_2='CAT_A'

The above definition means that when the value of a row for OBJ_1 is "Category A" the corresponding instance for OBJ_2 will be given a value of "CAT_A," thus allowing the instance to be converted from a first schema to a second schema.

Actions can be evaluated individually, or as sets. Action set, or mapping, definitions 246 can include a mapping identifier 248 that can be used to access or identify a particular mapping. As shown in FIG. 2, an action set includes a plurality of action identifiers 250, 252, 254. An action set typically applies an order to the included action identifiers 250, 252, 254. The action identifiers 250, 252, 254 are sequentially evaluated until the conditions of a particular action are satisfied, or all action identifiers for the rule set have been evaluated, and none were found to be satisfied. Normally, once the conditions for a particular action 250, 252, 254 are satisfied, the action is executed, and further evaluation of the rule set is discontinued, at least for a particular instance being evaluated. An example action set definition format can be <action> <action> <action>, with a specific example being:

MAPPING DEFINITION mapping_1: action_1, action_2

In the above definition, action 1 will first be evaluated. If the rule for action 1 is satisfied, the consequence for action 1 will be executed, and action 2 will not be evaluated for the instance being evaluated. If the rule for action 1 is not satisfied for a given instance, the rule for action 2 will be evaluated.

Example 5—Example Rule Recursion

Figure 3:
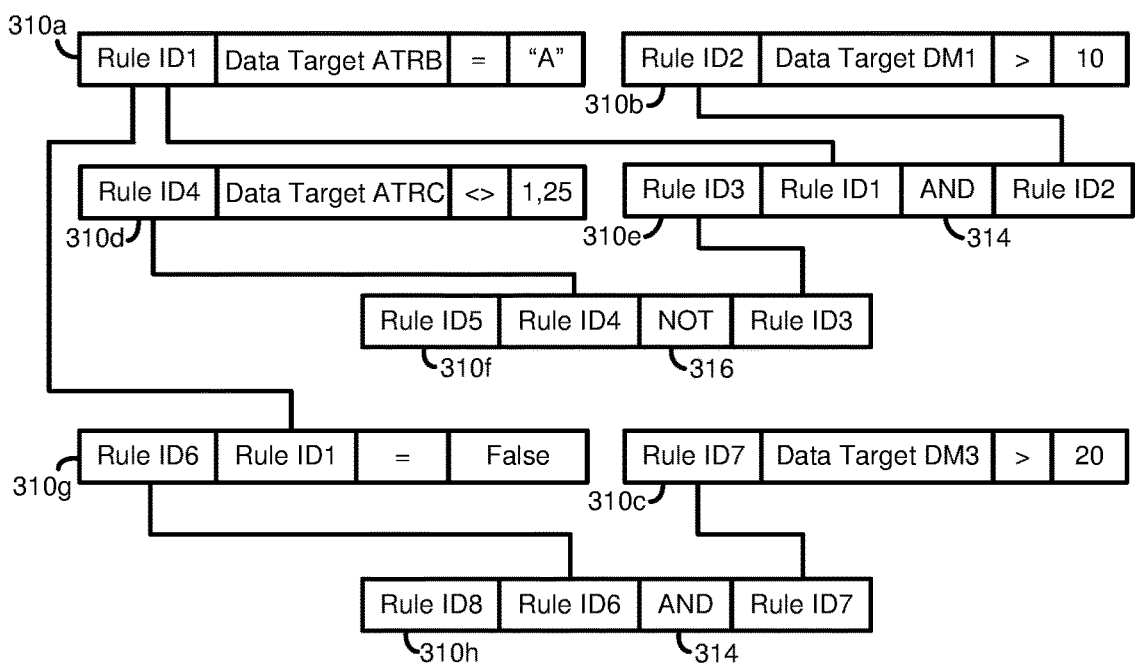
FIG. 3 is a diagram illustrating various rules, and how rules may be recursively related to one another.

FIG. 3 illustrates how rules can reference other rules, thus providing a recursive relationship between rules. FIG. 3 illustrates a plurality of rules 310 (rules 310a-310h as shown). Rules 310a, 310b, 310c are "independent," in that they do not themselves reference another rule. However, each of the rules 310a, 310b, 310c are referenced by one or more of recursively defined rules 310d, 310e, 310f, 310g, 310h. Rules 310d-310h are recursive in the sense that determination of the result for a given rule requires evaluation of one or more additional rules that are referenced by the given rule.

Rules 310e and 310h are both defined with reference to two other rules, and evaluate to true if both referenced rules evaluate to true, as indicated by the AND operators 314. Rule 310f is also defined with respect to two other rules, but evaluates to true if the first referenced rule evaluates to true and the second referenced rule evaluates to false, as indicated by the NOT operator 316.

Note that rule 310h involves two levels of recursion, as rule 310h references rule 310g, which in turn references rule 310a. Similarly, rule 310f references rule 310e, which in turn references rules 310a and 310b. Note also that a rule, such as rule 310a, can be referenced by multiple rules, such as being directly referenced by rules 310g and 310e, and indirectly referenced by rules 310h and 310f. Although not shown in FIG. 3, a given rule need not have a recursive relationship with any other rule—neither being referenced by another rule or referencing another rule.

FIG. 3 illustrates several important advantages of the recursive rule language technologies. For example, FIG. 3 illustrates how a given rule, such as rule 310a, can be reused in conjunction with multiple other rules. Although not shown in FIG. 3, another way that rules, such as rule 310a, can be reused is by incorporating a given rule into multiple actions, where an action in turn can be incorporated into multiple action sets.

Example 6—Example Implementation Architecture

Figure 4:
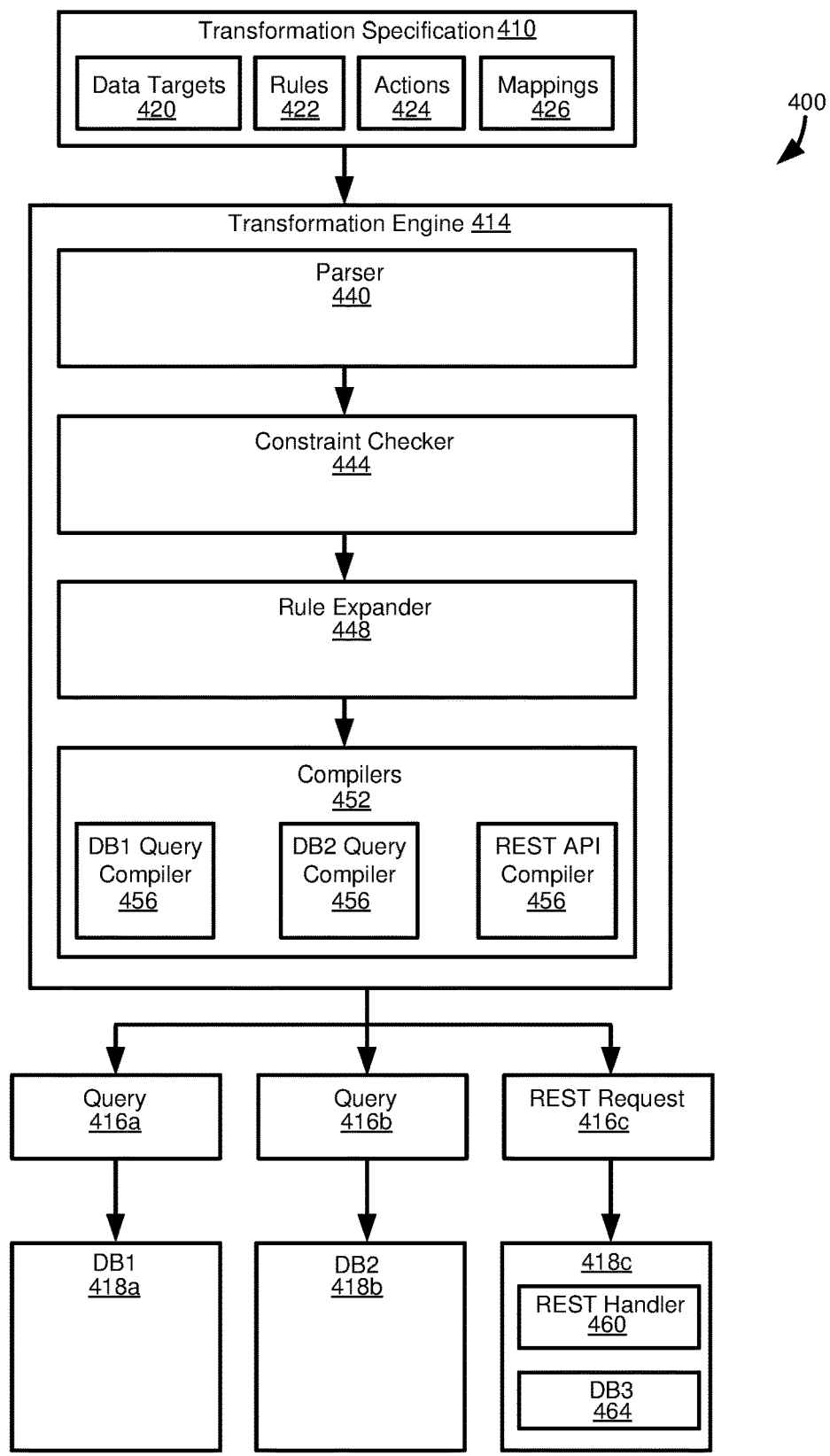
FIG. 4 is a diagram illustrating an example computing architecture in which recursive rule language technologies can be implemented.

FIG. 4 illustrates an example architecture 400 in which the recursive rule language technologies can be implemented. The architecture 400 generally includes a transformation specification 410, a transformation engine 414, one or more executable transformations 416 (shown as transformations 416a-416c), and one or more data stores (also referred to as data sources) 418 (shown as 418a-418c). The transformation specification 410 includes information sufficient to define a transformation in a programming-language independent representation, such as a domain specific language having the syntax shown in FIG. 2. The transformation specification 410 can be defined in a file, data structure, abstract data type, serialized format (e.g., JSON or XML), or other suitable representation. In some cases, the transformation specification 410 directly includes relevant transformation elements, such as rule definitions, action definitions, and the like. In other cases, the transformation specification 410 can define transformation elements (e.g., rules, actions) that are maintained or defined elsewhere, optionally included in one or more of the data stores 418. As an example, transformation specification 410 can include a full definition of a Rule X, or can indicate using an identifier that Rule X is used by the transformation, where the definition of Rule X can then be accessed by, or made available to, the transformation engine 414.

In some cases, the transformation specification 410 includes definitions of, or references to, data targets 420, rules 422, actions 424, mappings 426, or combinations thereof. Particularly when definitions of elements of a transformation specification 410 are not provided in the transformation specification itself, the transformation specification can include fewer elements. For example, it may be sufficient to include identifiers for actions 424 or mappings 426 that are used in the transformation specification 410. When the actions 424 or mappings 426 are accessed, the underlying rules, data targets, and, in the case of mappings, actions, can be determined and accessed (e.g., if an action X is defined with respect to rule Y, the transformation specification 410 can include a reference to action X, and when the definition of action X is accessed, it can be determined that the definition of rule Y should also be accessed in order to fully process action X).

The transformation engine 414 can include a parser 440, a constraint checker 444, a rule expander 448, and a compiler module 452. The parser 440 can process a transformation specification 410 to determine data targets 420, rules 422, actions 424, and mappings 426 included in the transformation specification. In the event references to elements of a transformation specification 410 are included rather than a full definition, the parser 440 (or another component, including a component not shown in FIG. 4) can retrieve full definitions for use in generating the executable transformations 416.

The constraint checker 444 can analyze components of the transformation specification 410, as provided by the parser 440, to determine whether the components comply with various constraints. One constraint can be syntactic correctness. Another constraint can be that components of the transformation specification 410 do not refer to components that are not included in the transformation. For instance, a constraint violation can be indicated if a mapping includes Action 1, Action 2, and Action 3, and Action 2 is not included in the transformation specification. Another constraint can be correct operator usage, such as making sure that a logical expression (e.g., AND) includes expressions on both sides of the operator. In some cases, the constraint checker 444 can perform more complex constraint checking, such as making sure a referenced data target exists on a data source 418, or confirming that data types associated with elements of the transformation specification 410 are the same or at least compatible (e.g. a comparison between an integer and a float may be allowed, as the types are compatible, but a comparison between an integer and a string may generate a constraint violation).

Figures 5, 6:
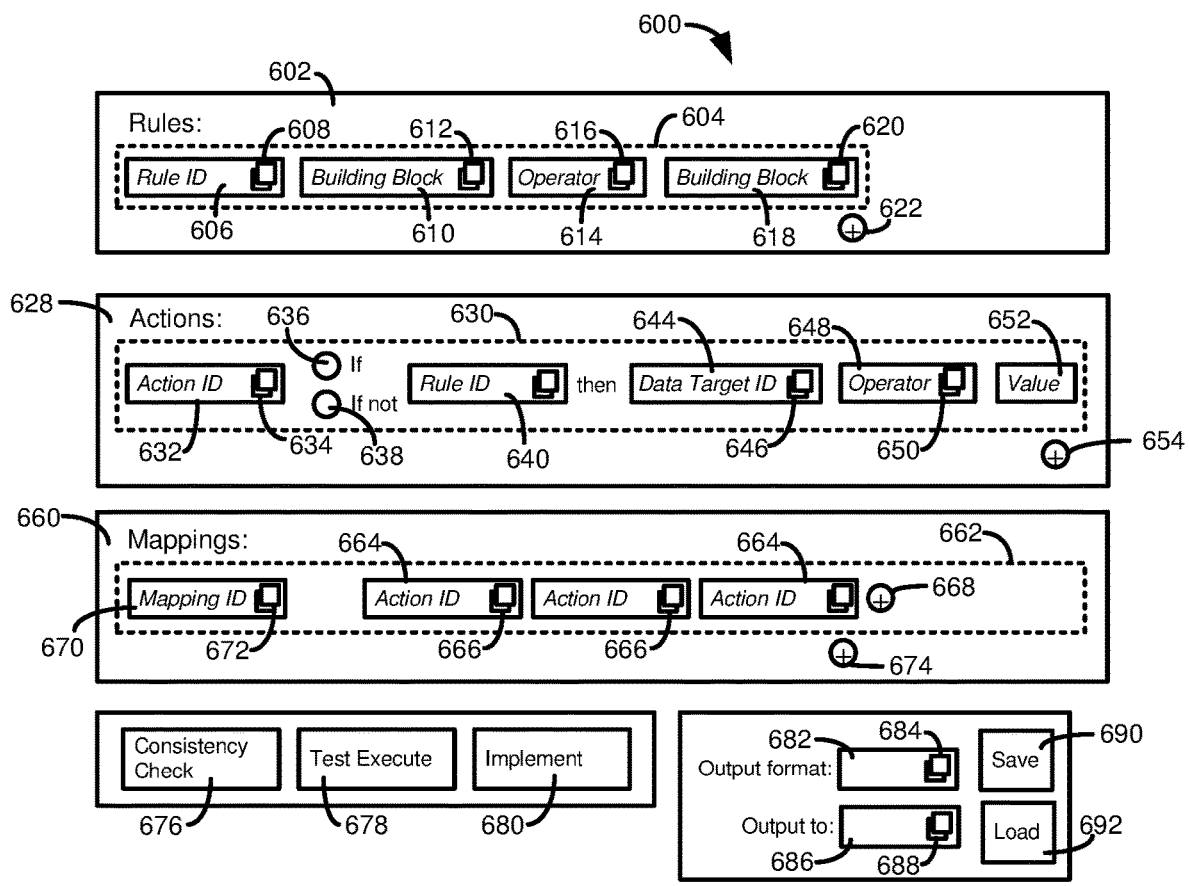
FIG. 5 illustrates how recursively defined rules can be converted to combined or nested conditional statements.
FIG. 6 is an example user interface screen for defining a data transformation specification.

The rule expander 448 can generate statements that can be converted by the compiler module 452 to an executable transformation 416. FIG. 5 illustrates an example of how a rule, rule_3, can be defined in terms of other rules, rule_1 and rule_2. The initial version of rule_3 does not independently contain enough information for rule_3 to be compiled into an executable format. The rule expander 448 can incorporate the definitions of rule_1 and rule_2 into a revised version 510 of rule_3, which directly includes the definitions of rule_1 and rule_2, and thus can be compiled into an executable format. In some cases, the rule expander 448 combines conditional statements associated rules having a recursive relationship into a nested manner, as shown in the revised version 520 of rule_3. The nested conditional statements can then be compiled into a particular executable format.

Although the rule expander 448 may be needed to convert at least some rules (e.g., rules that recursively reference other rules) into a form that can be compiled into an executable format, the conversion can be carried out automatically, rather than requiring manual conversion (e.g., manual code writing) by a programmer or software developer, or being required to be entered initially in a non-recursive manner (e.g., in the form 510 or 520). Thus, the rule expander 448 can facilitate the use of relatively simple rules (e.g., first order logic statements) as building blocks for complex rules, which in turn facilitates rule re-use, ease of understanding of rules and their interrelationships, debugging, and rule creation.

Returning to FIG. 4, the compiler module 452 can include one or more compiler engines 456. The compiler engines 456 are configured to convert elements of the transformation specification 410, including as processed by the parser 440, constraint checker 444, and rule expander 448, to an executable format 416 that can be executed by one or more of the data sources 418. Although shown as separate, multiple, including all, compiler engines 456 can be implemented in a single component, having routines for converting from a programming language independent format to a given executable format, which can be in a programming language or a collection of instructions that can be implemented by one of the data sources 418.

As an example of how a programming language—(or other executable instruction—) independent representation of the transformation specification 410 can be converted to one or more of the executable formats 416, which can then be executed on respective data sources 418, consider a scenario that includes a data source 418a, in the form of a database using a first query language (e.g., a particular dialect of SQL that may be used with database software provided by a particular vendor), a data source 418b, in the form of a database using a second query language (e.g., a dialect of SQL that is different than the dialect used by the data source 418a), and a data source 418c that is configured to receive requests for database operations (e.g., queries) using REST protocols, such as the OData protocol. The data source 418c can include a handler 460 that processes REST requests, which are then executed against a database system 464.

The transformation engine 414 can select the appropriate compiler engine 456 to produce a suitable executable transformation 416 that can be executed against a selected data source 418. That is, a user can select a particular data source 418, and the transformation engine 414 can convert the transformation specification 410 into an executable transformation 416a in the first SQL dialect, used by the data source 418a, an executable transformation 416b in the second SQL dialect, used by the data source 418b, into REST requests/API calls 416c to be processed by the data source 418c, or to multiple of these formats. In other cases, a user can select one or more formats for executable transformations 416 without having the corresponding executable transformation be sent to a data source 418 for execution (e.g., the executable transformation can be stored).

Example 7—Example Transformation Specification Definition User Interface

FIG. 6 is an example user interface screen 600 where a user can enter components of a data transformation specification in a programming language independent manner, as well as configure execution options. The screen 600 can provide a rule definition panel 602 that includes a template 604 for defining rules, such as having a field 606 where a user can enter an identifier for a rule being created, or can select an icon 608 to browse for a rule. That is, rules can be defined and stored for reuse, and the icon 608 can allow a user to select a rule repository and browse for rules. If the user selects a rule using the icon 608, rule elements can be populated in the screen 600. In some cases, the user may be allowed to modify populated rule elements.

The template can include a field 610 where a user can specify a first operand, or building block. As with the rule identifier field 606, the first operand field 610 can include an icon 612 that a user can select to browse for previously defined or specified operands. In some implementations, instead of, or in addition to, providing an icon 608, 612 that a user can select to browse for elements, representations of available elements can be provided on the screen 600, and a user may build rules by dragging and dropping elements into the appropriate location on the template 604. Similar functionality can be provided for other templates depicted in FIG. 6, which templates are further described below.

A user can enter an operator into an operator field 614, which can include an icon 616 which can be selected to choose from a list of available operators. For example, a window of available operators may be displayed when the icon 616 is selected, and the user can select one of the displayed operators. A second building block can be specified in operand field 618, including by selecting from available building blocks using icon 620. A user can select to add additional rules by selecting user interface element 622.

The screen 600 can include an action definition panel 628 that includes a template 630 for defining actions. The template 630 can include a field 632 where a user can enter an identifier for an action being created, or can select an icon 634 to browse for actions, which can be carried out at least generally as described for the rule template 604. In at least some examples, a user can select a user interface element 636 to indicate that the action is satisfied if a rule entered in a rule field 640 evaluates to true, or a user interface element 638 to indicate that the action is satisfied if a rule entered in the rule field evaluates to false.

The action template 630 includes elements that allow a user to specify actions that should be taken if the action conditions are met. A user can enter an identifier for a data target in field 644, or browse for data targets by selecting an icon 646. A user can enter an operator in field 648, or browse for an operator by selecting a user interface element 650, in a similar manner as for the operator field 614. A value can be entered in a field 652. As has been described, typically the operator for the operator field 648 is the assignment operator. Accordingly, in at least some cases, the operator field 648 and icon 650 can be omitted. If the conditions for the given action are satisfied for a given data instance, the value in the field 652 is assigned to the instance for the data target entered in the field 644. A user can select to create additional actions by selecting icon 654.

The screen 600 can provide a mapping definition panel 660 that includes a template 662 for defining mappings, or action sets. The template 662 can allow a user to enter actions for the mapping in fields 664, or to browse for actions by selecting an icon 666. Additional fields 664 can be added to a given mapping template 662 by selecting a user interface element 668. An identifier for the mapping can be specified in a field 670, or a user can browse for mappings by selecting an icon 672. Additional mappings can be created by selecting an icon 674.

A user can select to take various actions using information entered in the panels 602, 628, 660. For example, a user can select a consistency check user interface element 676, which can analyze the entered information to determine whether it is consistent, such as described with respect to the constraint checker 444 of FIG. 4. For example, selecting the consistency check user interface element 676 can run a check to determine whether all actions specified for a mapping in the panel 660 reference actions that exist in the panel 628 (or in another repository, at least in some examples). Similarly, selecting the user interface element 676 can run a check to determine whether all rules and data targets specified for an action 628 exist in the panel 602, or another repository. In the event inconsistencies exist, a user can be provided with a visual indication of the problem (e.g., "mapping X, action Z does not exist").

A user can select to test transformation information entered in the screen 600 by selecting a test execute icon 678. In some cases, selection of the test execute icon 678 causes results to be generated using a data set to which the rules are applied, but does not change the underlying data set. If the user wishes to implement a particular set of transformation operations, the user can select an implement user interface element 680, which can cause the transformation entered in the screen 600 to be executed against a specified data source, and the underlying data is modified according to the specified operations.

A user can select other options, such as an output format, which can be specified in a field 682, or selected from available options by selecting icon 684. The output format can determine what programming language or execution instruction type, such as SQL, the transformation operations will be converted to (e.g., specifying a particular compiler engine 456 of FIG. 4 to be used). Similarly, the user can specify a particular data source to which a transformation specification will be applied in field 686, or can select from available data sources by selecting icon 688.

As described above, transformation elements, or entire transformation specifications, can optionally be saved to, or loaded from, a repository. A user can select to save a transformation specification entered via the screen 600 using a save icon 690, or to load a transformation specification using a load icon 692.

Example 8—Example Executable Format Generation From Domain Specific Language Definition of Transformation Specification FIG. 7 provides an example transformation specification 710 and resulting SQL code 712 that can be produced using the recursive rule language technologies. The transformation specification 710 includes four data targets 714, OBJ_1-OBJ-4. The data targets can correspond to fields of one (or more) relational database tables. Rule definitions 716 specify particular values of the fields (or attributes) that will result in the rule evaluating to TRUE. Rule definition 716a (rule_3) is recursive, and evaluates to TRUE when two of the rules 716 (rule_1 AND rule_2) both evaluate to true.

The transformation specification 710 includes two actions, or consequences, 722 (shown as 722a, 722b), which specify values that will be assigned to OBJ_4 when particular rules are satisfied. A mapping 726 specifies that both actions 722 are to be evaluated, and that action 722a is to be evaluated before action 722b. As described, if the rule 716a for action 722a evaluates to TRUE, the corresponding consequence (e.g., assignment) is carried out, and action 722b is not evaluated. If the rule 716a is not satisfied, the consequence of action 722a is not carried out, and action 722b is evaluated.

The SQL code 712 is a nested query that includes a main SELECT statement 730 that selects results of one of inner SELECT statement 734 and inner SELECT statement 738. Statement 742 indicates that results of only one of statement 734 or 738 will be returned by the main SELECT statement 730. Inner SELECT statements 734, 738 operate similarly to a CASE statement (e.g., in C, C++), or a series of conditional statements, where the first conditional statement that is satisfied is executed, and then further evaluation of the conditional statements ceases.

Example 9—Example Data Target Generation

In some cases, a disclosed domain specific language, that is not a programming language, may not be powerful enough to accomplish a particular data transformation. For example, a transformation may require operations such as calculations, join operations (e.g., in a relational database system), groupings, aggregation operations, etc. However, a new data target can be created where the desired operations have been applied. For example, a more technical user can create a database view, and the database view (such as a particular field of the database view) can serve as the data target for the domain specific language. Thus, while often the vast majority of transformation operations can be natively accomplished using the disclosed domain specific language, such as on a "base" database system, operations that cannot natively be accomplished can still be carried out using the domain specific language, once a suitable data target has been created. Although some intervention by a technical use may be required, the overall process for conducting a data transformation can still be greatly simplified compared with a scenario where the disclosed domain specific language is not used.

Example 10—Example Data Transformation Operations

FIG. 8 is a flowchart of an example method 800 of compiling a transformation specification in a domain specific language to an execution format. The method 800 can be implemented in the computing architecture 400 of FIG. 4. At 810, user input is received defining at least a first rule. The at least a first rule is of a rule format. The rule format includes a first building block, an operator, and a second building block. The first and second building blocks serve as operands for the first operator, and are selected from rules having the rule format, a data target, or a literal of a data type.

User input is received at 820 defining at least one action. The at least one action is of an action format. The action format includes a rule serving as a predicate for the at least one action, a second operator to be executed if the predicate is satisfied, a data target serving as a first operand for the second operator, and a value serving as a second operand for the second operator. At 830, a transformation specification is instantiated that includes the at least a first rule and the at least one action. An execution format to which the transformation specification is to be converted is determined at 840. At 850, the transformation specification is compiled to the execution format.

FIG. 9 is a flowchart of a method 900 that can be performed by domain specific language compiler. The method 900 can be carried out in the computing environment 400 of FIG. 4. At 910, a data transformation specification in a domain specific language is retrieved. The data transformation specification is parsed at 920 to determine at least a first rule and at least a second rule specified in the data transformation specification. The data transformation specification is parsed at 930 to determine at least a first action specified in the data transformation specification. At 940, it is determined that the at least a second rule references the at least a first rule. Nested conditional statements are generated at 950, representing conditions of the at least a first rule and the at least a second rule. An execution format is determined at 960. At 970, the nested conditional statements are compiled to the execution format.

FIG. 10 is a flowchart of a method 1000 for rendering a data transformation specification user interface useable to define a data transformation specification in a domain specific language. At 1010, a rule definition template is displayed. The rule definition template includes a user interface element for a first building block, a user interface element for an operator, and a user interface element for a second building block. An action definition template is displayed at 1020. The action definition template includes a user interface element for a rule and a user interface element for a value. At 1030, user input is received for the rule definition template and the action definition template, defining at least one rule and at least one action. A data transformation specification in a domain specific language is generated at 1040, and includes the at least one rule and the at least one action.

Example 11—Matching Metastructure System Architecture

Figure 11A:
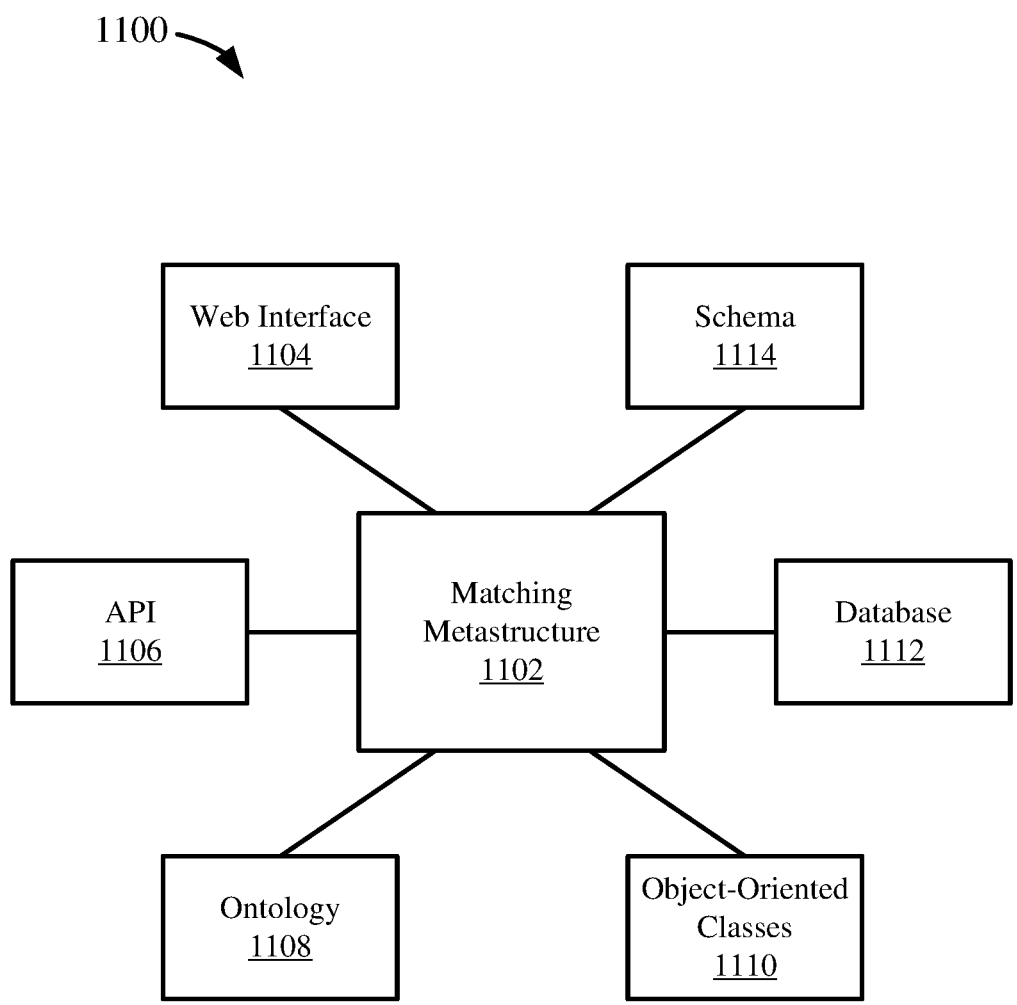
FIG. 11A is a diagram depicting a matching metastructure schema between data models.

FIG. 11A is a diagram 1100 depicting a matching metastructure between various types of data models. The matching metastructure 1102 may be used to represent a wide variety of types of data models 1104, 1106, 1108, 1110, 1112, 1114. For example, the matching metastructure may be used to describe or represent a web interface 1104, an application program interface (API) 1106, an ontology or ontological description of a domain 1108, object-oriented classes 1110, a database structure 1112, or a schema (e.g. for a database, or as an entity-relationship diagram) 1114. The matching metastructure 1102 may describe or represent other types of data models as well. Generally, any type of data model may be represented by the matching metastructure 1102 because of the specific structure of the matching metastructure, as described in detail in FIG. 12A.

The matching metastructure 1102 may also include mappings between different data models. In such cases, the data models may be of the same type, for example, from a database schema 1112 (1114) to another database schema 1112 (or 1114). In other such cases, the data models may be of different types, for example, from an API 1106 to a set of object-oriented classes 1110. Because the matching metastructure 1102 is a versatile format for representing data models, data models of different types may be mapped, compared, or otherwise integrated using the matching metastructure. The matching metastructure may facilitate the schema alignment technologies disclosed in SCHEMA ALIGNMENT AND STRUCTURAL DATA MAPPING OF DATABASE OBJECTS patent application filed concurrently herewith, having inventors Sandra Bracholdt, Volker Saggau, and Jan Portisch, and incorporated herein by reference.

Figure 11B:
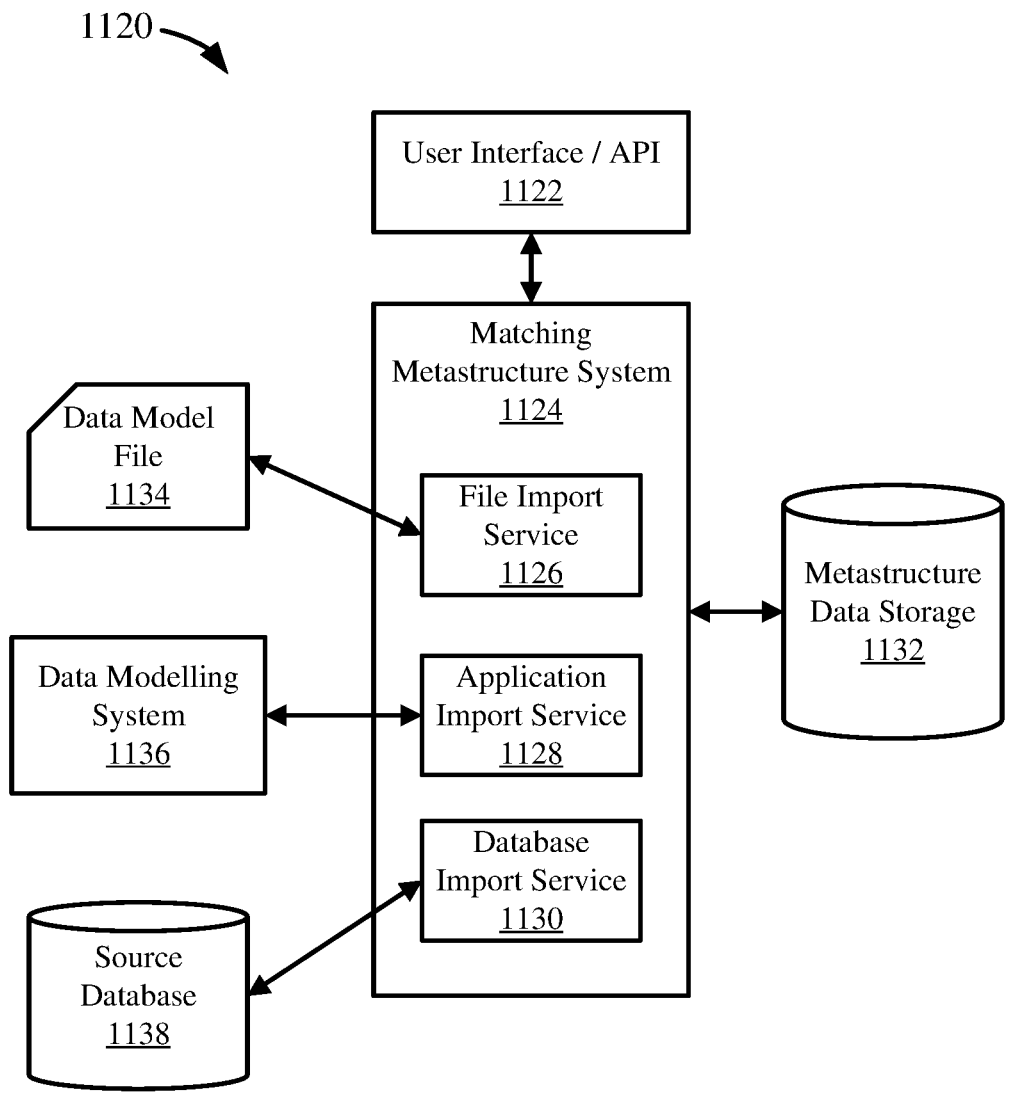
FIG. 11B is an architecture diagram depicting a system for using and storing the matching metastructure.

FIG. 11B is an architecture diagram depicting a system 1120 for using and storing the matching metastructure 1102.

A matching metastructure system 1124 may provide functionality for converting a data model into the matching metastructure 1102. In some embodiments, the matching metastructure system 1124 may also convert mapping data between two data models into the matching metastructure 1102 as well. Additionally or alternative, the matching metastructure system 1124 may access a data model alignment or mapping system for mapping two data models and receive the mapping results for storage within a matching metastructure data storage 1132. The matching metastructure system 1124 may perform full lifecycle operations and maintenance on matching metastructure data, such as the versioning as described herein. The matching metastructure system 1124 may have a file import service 1126, an application import service 1128, or a database import service 1130, or a combination thereof. The matching metastructure system 1124 may be a stand-alone system or software program, or may be a matching metastructure module as described herein.

The file import service 1126 may be an exposed interface for receiving or obtaining a data model file 1134 storing a description of a data model (e.g. data model schema, graph representation, UML file, etc.). The file import service 1126 may accept the data model file 1134 and convert it appropriately for use by the matching metastructure system 1124, such as to convert the data model file 1134 into the matching metastructure or to persist the data model file 1134 in the metastructure data storage 1132, such as after the data model file is converted to the matching metastructure or if the data model file is already in the matching metastructure format. In some embodiments, the file import service 1126 may allow multiple data model files 1134 to be uploaded to the matching metastructure system 1124 in batch, or simultaneously.

The application import service 1128 may be an exposed interface for communicating with a data modelling system 1136. The application import service 1128 may receive a data model from the data modelling system 1136 for conversion to the matching metastructure or persistence in the matching metastructure data storage 1132, such as for persisting after the data model received from the data modelling system is converted to the matching metastructure, or for persisting if the received data model is already in the matching metastructure format. The application import service 1128 may request a data model from a data modelling system 1136. In other embodiments, the application import service 1128 may receive a data model from a communication initiated by the data modelling system 1136. The matching metastructure system 1124 may have multiple application import services 1128 for communication with different data modelling systems 1136. In other embodiments, the application import service 1128 may have one or more adapters or plug-ins for communication with different data modelling systems or services 1136. Examples of a data modelling system 1136 are SAP PowerDesigner™ and SAP ArchitectDesigner™, both of SAP SE of Walldorf, Germany.

The database import service 1130 may be an exposed interface for accessing a source database 1138. The database import service 1130 may receive a data model from the source database 1138 for conversion to the matching metastructure or persistence in the matching metastructure data storage 1132, such as after the data model received from the source database is converted to the matching metastructure or if the received data model is already in the matching metastructure format. The database import service 1130 may request a data model from a source database 1138. A source database may store a data model, such as a database schema, in a data dictionary or other configuration table or tables, which may be accessed by or provided to the matching metastructure system 1124 through the database import service 1130. The database import service 1130 may have access to database connection information and database credentials, which it may use to query (e.g. via SQL) a source database 1138 for a database schema representing the data model of the source database. In some embodiments, the database import service 1130 may have one or more adapters or plug-ins for accessing different source databases.

The matching metastructure system 1124 may access the metastructure data storage 1132 to store metastructure descriptions of data models and alignment data for mapping between data models. The metastructure data storage 1132 may be a database implementing a schema of the matching metastructure as described herein.

The matching metastructure system 1124 may be implemented as a multitenant system with the metastructure data storage 1132 as a multitenant database. In such an embodiment, the metastructure data storage 1132 may be a single database, such as a distributed database, housing metastructure data for multiple tenants. In such embodiments, a tenant may only be able to access their metastructure data, but smart services may be able to collect or analyze data across tenants, such as for analyzing data model alignments or mappings. For example, for common, standard, or non-proprietary data models, the matching metastructure definition for the non-proprietary data model may be available between multiple tenants, thus allowing the metastructure system 1124 to avoid re-creating commonly used data models in the matching metastructure.

The matching metastructure system 1124 may have a user interface/API 1122. The user interface 1122 may provide a user with a display of data models stored in the matching metastructure system 1124. The user interface/API 1122 may allow a user to select a source 1134, 1136, 1138 for obtaining a data model for conversion or storage in the matching metastructure system 1124. The user interface/API 1122 may allow a user to configure a set of options for converting or storing data models in the matching metastructure system 1124. The user interface/API 1122 may allow another program or process to access the matching metastructure functionality of the matching metastructure system 1124, such as to obtain a matching metastructure representation of a data model (e.g. from the metastructure data storage 1132) or to convert a data model to the matching metastructure format.

The user interface/API 1122 may allow programmatic access to the matching metastructures representing data models in the matching metastructure system 1124. For example, the user interface/API 1122 may provide create, update, delete (CRUD) services for the matching metastructures, and may further control access to the metastructure data storage 1132 (which may be through the matching metastructure system 1124). The user interface/API 1122 may also provide access to previously created matching metastructure schemas, such as for common or non-proprietary data models. The user interface/API 1122 may include a web interface, which may include a RESTful implementation of the user interface/API, including implementations using the OData protocol.

Example 12—Matching Metastructure Definition

Figure 12A:
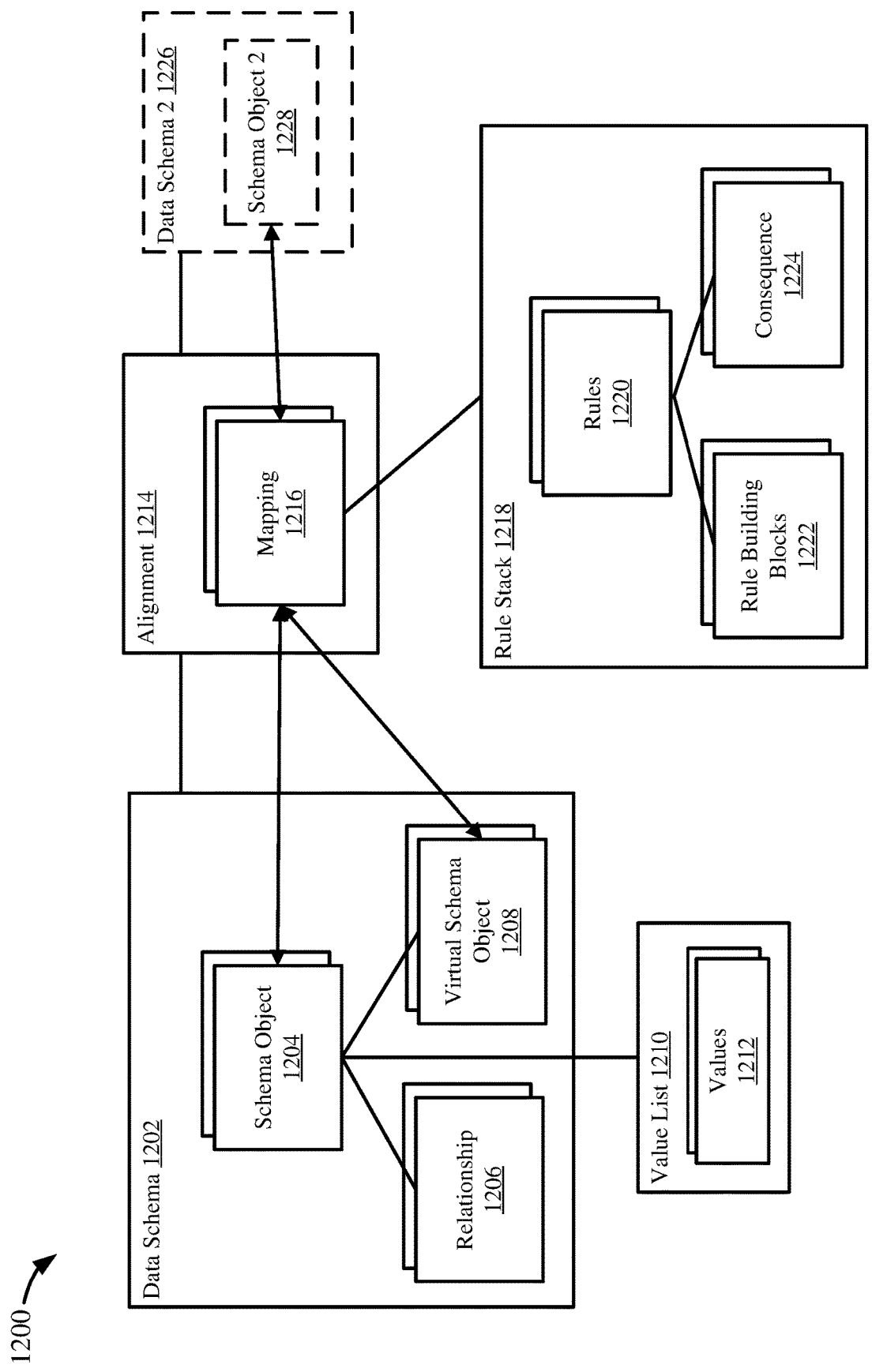
FIG. 12A depicts a matching metastructure definition.

FIG. 12A depicts a matching metastructure definition 1200. The matching metastructure may be persisted, and may be stored as, or converted to, a graph representation.

The matching metastructure 1200 may have one or more data schemas 1202, 1226. A data schema object 1202, 1226 generally describes the structure in which data for a data model is held in the metastructure. For example, the structure may include information describing the technical (e.g. data type) and semantic (e.g., what the data means, how it is formatted, how it may be used, etc.) properties of data associated with the data model. A data schema 1202, 1226 may have multiple schema objects 1204 (each of which may be instantiated one or more times), multiple relationship objects 1206, or multiple virtual schema objects 1208, or a combination thereof (including none).

A data schema 1202, 1226 may also have several properties. The data schema 1202 may have an identifier property (e.g. DataSchemaID field or variable) for uniquely identifying the data schema. The data schema 1202 may have a model identifier property (e.g. ModelID field or variable) for identifying the data model (e.g. file or database schema, which could be in the form of a URI) described by the data schema. The data schema 1202 may have a type property (e.g. DataSchemaType field or variable) that indicates the type of data model represented in the data schema 1202. Examples of different types are: a relational database schema, a conceptual data model, or an application program interface (API). The data schema 1202 may have a version number property (e.g. Version field or variable) indicating the version of the data schema, which may be used in versioning as described herein. The data schema 1202 may have a human-understandable description property (e.g. Name field or variable). The data schema 1202 may have a publisher property (e.g. Publisher field or variable) indicating the creator or source of the data schema. In some embodiments, a data schema 1202, 1226 may have additional or alternative properties.

A schema object 1204, 1228 generally describes a structural component of a data model, or a structural component of a portion of a data model, represented by the data schema 1202, 1226. For example, a structural component for a database schema may be a table, or a column in a table, or a view, and so on. As another example, a structural component for an API may be a function call or an argument to a function call. Generally, a data schema 1202 has a schema object 1204 for all structural components identified in the data model described by the data schema.

A schema object 1204, 1228 may also have several properties. The schema object 1204 may have an identifier property (e.g. ObjectID field or variable) for uniquely identifying the schema object. The schema object 1204 may have a component identifier property (e.g. ComponentID field or variable) for identifying the structural component (e.g. table in a database, column in a database table, function call in an API) described by the schema object. The schema object 1204 may have a type property (e.g. ObjectType field or variable) that indicates the type of the structural component described by the schema object 1204. Examples of different types are: a relational database table, a relational database attribute (e.g. column), a function in an API, or an interface parameter (e.g. argument to a function call in an API). The schema object 1204 may have a human-understandable description property (e.g. Name field or variable). In some embodiments, a schema object 1204 may have additional or alternative properties.

A schema object 1204, 1228 may reference a value list 1210. A value list 1210 may have, or enumerate, a set of values 1212 that instances of the schema object 1204 that references the value list may have. In some cases, the value list 1210 may be a mutually exclusive set of values 1212. Generally, a schema object 1204, 1228 associated with a value list 1210 may only have the values 1212 in the value list when instantiated. As an example, a schema object 1204 describing a "date month" field may reference a value list 1210 having values 1212 "January," "February," "March," and so on. In some cases, a value list 1210 may provide a range for values 1212, instead of a discrete set of values. As an example, a schema object 1204 describing a "date year" field may reference a value list 1210 having a range of values 1212 of 1900 to 2000.

A relationship object 1206 generally describes a relationship between structural components represented by schema objects 1204 of a data model represented by the data schema 1202. For example, a relationship (e.g. an ontological relationship) between a database table and a column in the table may be that the column is an "attribute of" the table. As another example, a relationship between an API function and a variable for the function may be that the variable is an "argument of" the function. Generally, a relationship object 1206 relates two schema objects 1204 in a data schema 1202 (e.g. the same data schema) and describes the relationship or association between the schema objects. This relationship may be expressed as $R(O_1, O_2, T)$, where R is the relationship object, $O_1$ is the first schema object, $O_2$ is the second schema object, and T is the type of relationship between $O_1$ and $O_2$.

A relationship object 1206 may also have several properties. The relationship object 1206 may have an identifier property (e.g. RelationshipID field or variable) for uniquely identifying the relationship object. The relationship object 1206 may have a first schema object identifier property (e.g. Object1ID field or variable) for identifying the first schema object 1204 (e.g. table in a database, column in a database table, function call in an API) in the relationship. The relationship object 1206 may have a second schema object identifier property (e.g. Object2ID field or variable) for identifying the second schema object 1204 (e.g. table in a database, column in a database table, function call in an API) in the relationship. The relationship object 1206 may have a type property (e.g. RelationshipType field or variable) that indicates the type of the relationship between the first and second schema objects 1204. Examples of different types of relationships are: attribute of, foreign key of, argument of, component of. The relationship object 1206 may have a human-understandable description property (e.g. Name field or variable). In some embodiments, a relationship object 1206 may have additional or alternative properties.

As an example, a data schema S may describe a database data model or schema. The data schema S may have a schema object $O_1$ describing a database table and a schema object $O_2$ describing a column in the database table. Thus, a relationship object may be described as $R(O_1, O_2, \text{AttributeOfTable})$, where $(O_1, O_2, \in S)$ for which S.DataSchemaType="RelationalDatabaseSchema" and $O_1$.ObjectType="Table" and $O_2$.ObjectType="Attribute."

A virtual schema object 1208 is generally similar to a schema object 1204, having similar properties to a schema object. A virtual schema object 1208 may describe a schema object 1204 from which it is derived (or multiple schema objects), which in turn describes a structural component of a data model represented by the data schema 1202. Further, a virtual schema object 1208 is generally aware of the schema objects 1204 from which it is derived. For example, a virtual schema object 1208 may have a source schema object property (e.g. SourceSchemaObject1ID as a field or variable) which indicates a schema object (or multiple schema objects) from which it was derived. Example types of virtual schema objects are a calculation view in a relational database (e.g. view that calculates averages of data across several tables), a calculation view attribute in a relational database (e.g. a returned result for an average query of data across several tables), or a function in an API that calls multiple other functions available in the same API.

In some embodiments, a virtual schema object 1208 may describe multiple schema objects 1204, and so represent a composition or an aggregation of those schema objects (e.g. a virtual table that is formed from three schema objects 1204 representing actual tables). Thus, a virtual schema object 1208 may act as an assembling of multiple schema objects 1204, which may be useful in mapping or aligning the data schema (e.g. 1202) with another data schema (e.g. 1226, such as when a single schema object 1204 of the data schema 1202 corresponds to multiple schema objects of the data schema 2 1226, or vice versa). Virtual schema objects 1208 may also be useful for developing a rule stack 1218 for transforming one or more schema objects 1204 to their mapped counterparts 1228 in another data model 1226. In some cases, a virtual schema object 1208 may allow for development of a rule in a particular rule language (e.g. recursive rule language as described herein) where this cannot be done, or cannot easily be done, using the underlying schema objects 1204 for the virtual schema object.

A virtual schema object 1208 may allow for distinguishing between original schema objects 1204 and schema objects that were developed or created later. Further, virtual schema objects 1208 may be used to track or calculate statistics about alignments 1214. For example, a virtual object 1208 may be mapped to a schema object 1228 in another data schema 1226, but underlying schema objects for the virtual schema object may not be so mapped, or may not be explicitly mapped. The virtual schema object 1208 may be useful to identify or track such scenarios for analysis.

Virtual schema objects 1208 may also be used for clustering schema objects 1204 within a matching metastructure describing a data model. Clustering a data model may make understanding a data model easier for users or programmers, and may improve schema mapping or alignment processes. The schema objects 1204 in a matching metastructure 1200 may be clustered using clustering technology as disclosed in the CLUSTERING WITHIN DATABASE DATA MODELS patent application filed concurrently herewith, having inventors Sandra Bracholdt, Bjoern Pantel, Volker Saggau, and Jan Portisch, and incorporated herein by reference. Clusters of schema objects 1204 may be described by virtual schema objects 1208.

The matching metastructure 1200 may have one or more alignments 1214. An alignment 1214 generally describes or identifies equivalent structural components (e.g. semantically equivalent, structurally equivalent, data equivalent) between two data schemas, which generally describe separate data models. An alignment 1214 may have multiple mapping objects 1216 (including none). This may be expressed as $A(DS_S, DS_T, M)$, where A is the alignment, $DS_S$ is the first or source data schema, $DS_T$ is the second or target data schema, and M is the set of one or more mapping objects (or, in some cases, zero or more mappings).

An alignment 1214 may also have several properties. The alignment 1214 may have an identifier property (e.g. AlignmentID field or variable) for uniquely identifying the alignment. The alignment 1214 may have a first data schema identifier property (e.g. DataSchema1ID field or variable) for identifying the first, or source, data schema 1202 (e.g. data model). The alignment 1214 may have a second, or target, data schema identifier property (e.g. DataSchema2ID field or variable) for identifying the second data schema 1226 (e.g. data model) that is aligned or has been mapped to the first data schema. The alignment 1214 may have a human-understandable description property (e.g. Name field or variable). The alignment 1214 may have a version number property (e.g. Version field or variable) indicating the version of the alignment, which may be used in versioning as described herein. In some embodiments, an alignment 1214 may have additional or alternative properties.

A mapping object 1216 generally describes an equivalence between one or more structural components represented by schema objects 1204 of a data model represented by the data schema 1202 and one or more structural components represented by schema objects 2 1228 of a second data model represented by the data schema 2 1226. For example, a database table in a first data model may be mapped to a database table in a different data model because they are deemed to be semantically equivalent (or, in at least some cases, technically or structurally equivalent). Semantically equivalent structural components are structural components that have the same or approximately the same conceptual data, even if named, stored, or organized differently within the component. For example, a database table named "Users" with fields "name," "ID," and "permissions" may be semantically equivalent to a database table named "t453_1" with fields "a", "b," "c," and "d." In at least some cases, conceptual data can be equivalent even though the datatypes associated with the data (e.g., fields) are different between the data models, such as having a field A in a first model having a data type of integer and a field 1 in a second model having a data type of float.

A mapping object 1216 may also have several properties. The mapping object 1216 may have an identifier property (e.g. MappingID field or variable) for uniquely identifying the mapping object. The mapping object 1216 may have a first schema object identifier property (e.g. Object1ID field or variable) for identifying the first, or source, schema object 1204 (e.g. table in a database, column in a database table, function call in an API) in the mapping. In some cases, the first schema object identifier may be a set of multiple schema object identifiers from the source data schema (e.g. multiple schema objects in the source data schema map to a single schema object in the target schema). The mapping object 1216 may have a second schema object identifier property (e.g. Object2ID field or variable) for identifying the second, or target, schema object 1228 (e.g. table in a database, column in a database table, function call in an API) in the mapping. In some cases, the second schema object identifier may be a set of multiple schema object identifiers from the target data schema (e.g. multiple schema objects in the target data schema map to a single schema object in the source schema). The mapping object 1216 may have a confidence property (e.g. Confidence field or variable) that indicates the strength or correctness of the mapping between the first and second schema objects 1204, 1228. The confidence property may be expressed as a percentage, a normalized score, or as another value, or, in some cases, a qualitative identifier (e.g., high, medium, low). The mapping object 1216 may have a human-understandable description property (e.g. Name field or variable). In some embodiments, a mapping object 1216 may have additional or alternative properties.

A mapping object 1216 may reference a rule stack 1218. A rule stack 1218 may be a set of one or more, optionally ordered, rules 1220 composed of rule building blocks 1222 and having consequences 1224. The rule stack 1218 (and its components 1220, 1222, 1224) may be recursive rule language rules, as described herein. Generally, a rule 1220 is a first order logic expression that is built using the rule building blocks 1222. A consequence 1224 for a rule is an action (or actions) that is taken when the rule evaluates to true. A consequence 1224 may specify a value that is to be written to a target schema object (e.g. schema object 2 1228) in a target data schema (e.g. data schema 2 1226).

Generally, a mapping object 1216 defines equivalent schema objects 1204, 1228 between separate data schemas 1202, 1226. Generally, a rule stack 1218 describes how to translate data from the source schema object 1204 to the target schema object 1228, such as identified in the mapping object. Generally, a rule stack 1218 for a mapping object 1216 only uses schema objects 1204, 1228 from the data schemas 1202, 1226 used in the alignment 1214 with which the mapping object is associated.

The data objects (e.g. data schema 1202, schema objects 1204, etc.) in the matching metastructure 1200 may be implemented as datatypes for various implementations, such as tables, classes, attributes, variables, and so on.

Figure 12B:
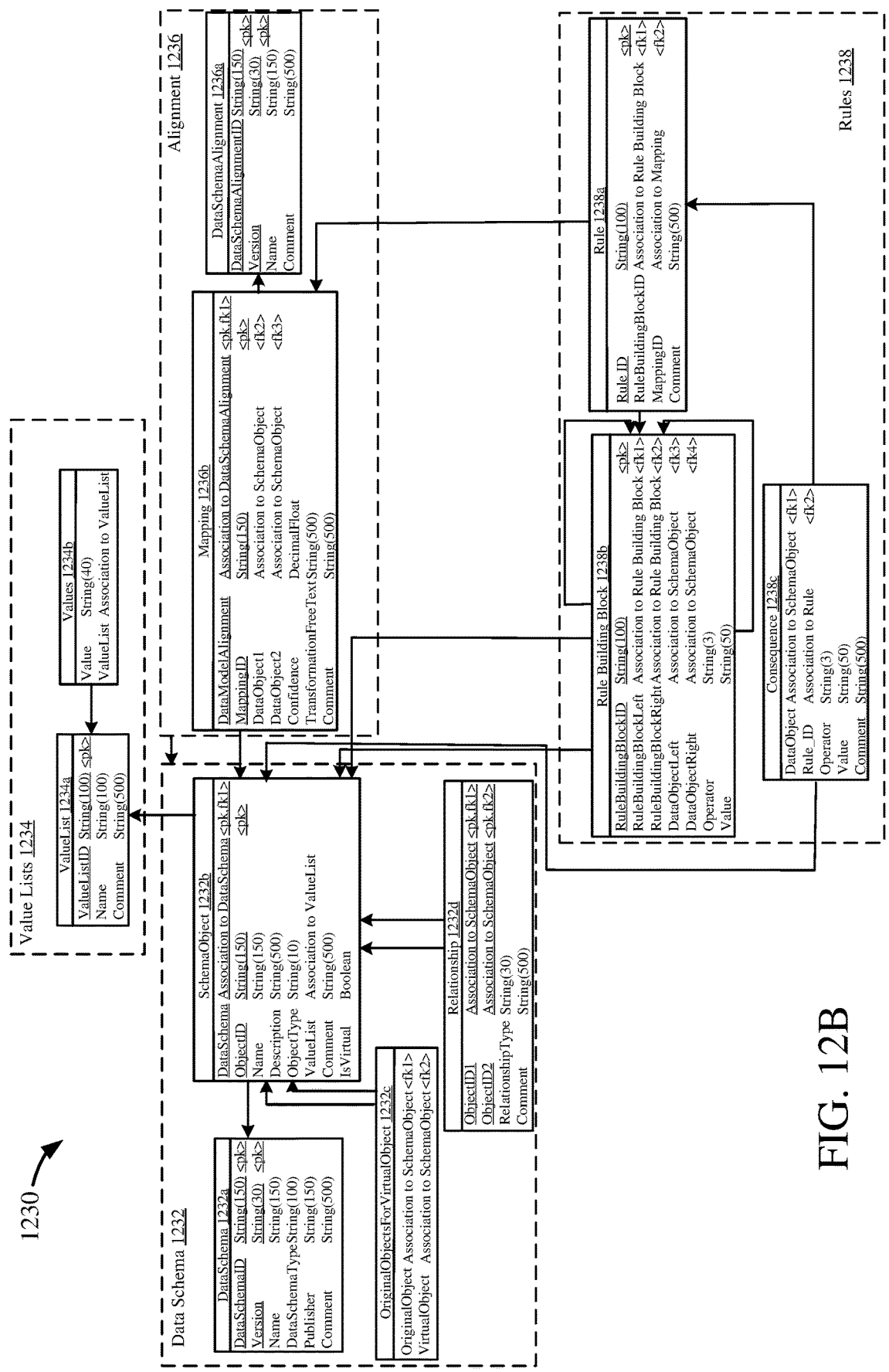
FIG. 12B depicts an example implementation of the matching metastructure as a database schema.

FIG. 12B depicts an example implementation of the matching metastructure as a database schema 1230. The example matching metastructure database schema 1230 may be a physical data model implemented in a database system, and may store the matching metastructure objects as rows in tables. The example database schema 1230 may include a data schema 1232 having a DataSchema table 1232*a* storing data schemas, a SchemaObject table 1232*b* storing schema objects, an OriginalObjectsForVirtualObjects table 1232*c* storing virtual schema objects, and a relationship table 1232*d* storing relationship objects. The example database schema 1230 may include value lists 1234 having a ValueList table 1234*a* storing values lists and a Values table 1234*b* storing values for the value lists.

The example database schema 1230 may include an alignment 1236 having a DataSchemaAlignment table 126*a* storing alignments, and a Mapping table 1236*b* storing mapping objects for the alignments. The example database schema 1230 may include rules 1238 having a Rule table 1238*a* storing rules for mapping transformations, a Rule Building Block table 1238*b* storing rule building blocks for the rules, and a Consequence table 1238*c* storing consequences or results for the rules when triggered or satisfied.

Figure 12C:
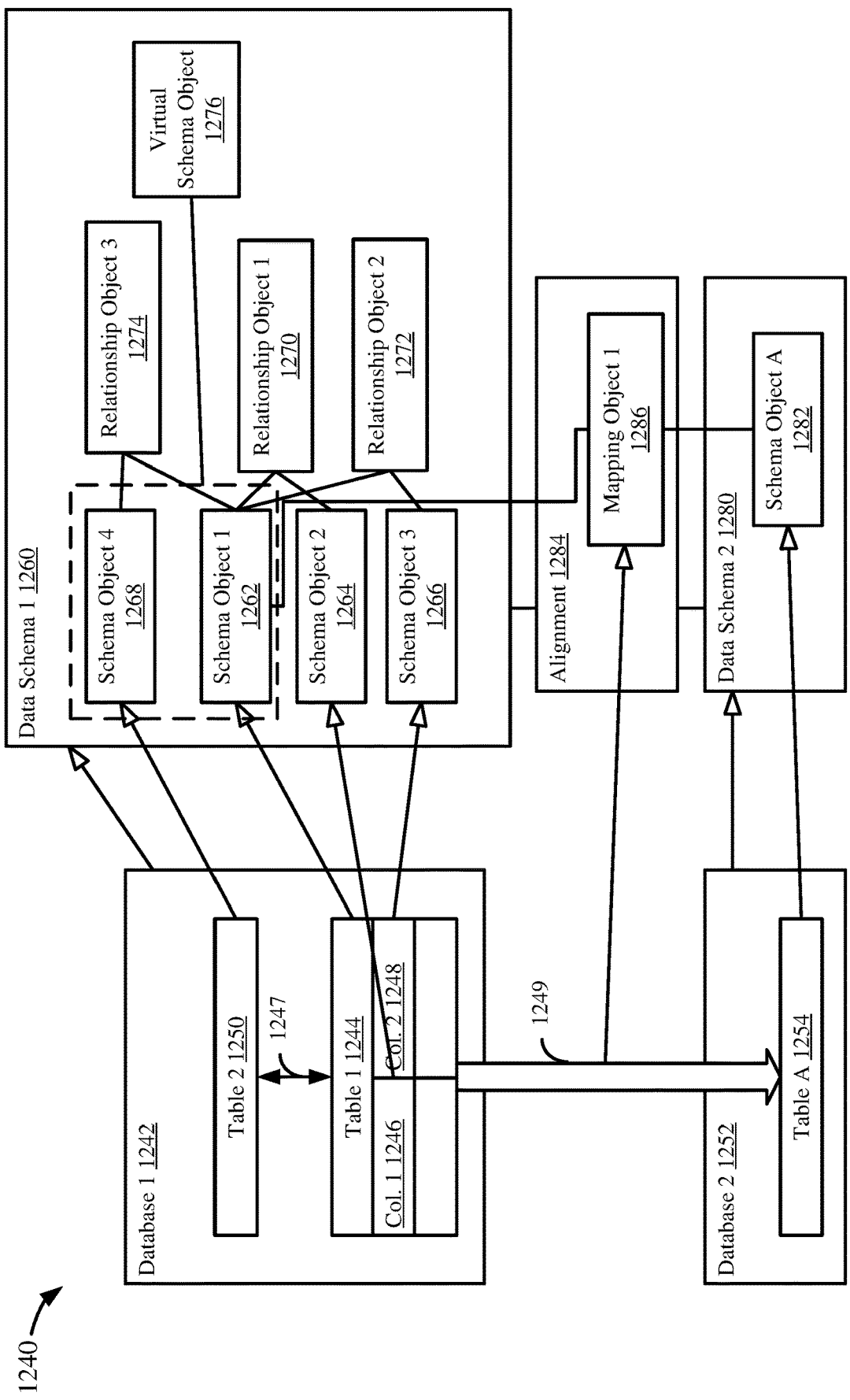
FIG. 12C is a diagram depicting an example matching metastructure for two databases.

FIG. 12C is a diagram depicting an example 1240 matching metastructure for two databases. A database 1 1242 may have a table 1 1244, which may have a column 1 1246 and a column 2 1248, and a table 2 1250. Table 1 1244 may be associated 1247 with table 2 1250, such as through foreign keys. A database 2 1252 may have a table A 1254. Database 1 1242 may be aligned with database 2 1252, the process of which may have mapped 1249 table 1 1244 to table A 1254.

Database 1 1242 may be represented or described in the matching metastructure by data schema 1 1260, which may be a data schema as described for the matching metastructure herein. Similarly, database 2 1252 may be represented in the matching metastructure by data schema 2 1280. A data schema object 1260, 1280 may be implemented similar to the following example code:

```
public class JpaeSchema{
    @Id
    @Column(length=2000)
    public String uri;
    public String schemaCode;
    public String schemaName;
    public String schemaVersionCode;
    public String schemaVersionName;
    public SchemaType schemaType;
    public String getSchemaCode( ) {
        return schemaCode;
    }
    public void setSchemaCode(String schemaCode) {
        this.schemaCode = schemaCode;
    }
    public String getSchemaName( ) {
        return schemaName;
    }
    public void setSchemaName(String schemaName) {
        this.schemaName = schemaName;
    }
    public String getSchemaVersionCode( ) {
        return schemaVersionCode;
    }
    public void setSchemaVersionCode(String schemaVersionCode) {
        this.schemaVersionCode = schemaVersionCode;
    }
    public String getSchemaVersionName( ) {
        return schemaVersionName;
    }
    public void setSchemaVersionName(String schemaVersionName) {
        this.schemaVersionName = schemaVersionName;
    }
    public SchemaType getSchemaType( ) {
        return schemaType;
    }
```

-continued

```
    public void setSchemaType(SchemaType schemaType) {
        this.schemaType = schemaType;
    }
}
```

Table 1 1244 may be represented in the matching metastructure by schema object 1 1262, which may be a schema object as described for the matching metastructure herein. Similarly, column 1 1246 may be represented in the matching metastructure by schema object 2 1264 and column 2 1248 may be represented in the matching metastructure by schema object 3 1266. Similarly, table 2 1250 may be represented in the matching metastructure by schema object 4 1268. A schema object 1262, 1264, 1266, 1268, 1282 may be implemented similar to the following example code:

```
public class JpaeSchemaNode {
    @Id
    @Column(length=2000)
    public String uri;
    public String rootUri;
    public String schemaNodeCode;
    public String schemaNodeName;
    @Column(columnDefinition="CLOB")
    @Lob
    public String description;
    public SchemaNodeType schemaNodeType;
    @Column(length=2000)
    public String schema_uri;
}
public class JpaePDMEntity extends JpaeSchemaNode{
}
public class JpaeAttribute extends JpaeSchemaNode {
    public boolean isKey;
    public boolean isMandatory;
}
public class JpaePDMAttribute extends JpaeAttribute{
}
public class JpaeCDMInheritance extends JpaeSchemaNode{
}
public class JpaeCDMEntity extends JpaeSchemaNode{
}
public class JpaeCDMAttribute extends JpaeAttribute {
}
```

The association between table 1 1244 and column 1 1246 (e.g. column 1 as an attribute of table 1) may be represented in the matching metastructure as relationship object 1 1270, which may reference schema object 1 1262 and schema object 2 1264. Similarly, the association between table 1 1244 and column 2 1248 (e.g. column 2 as an attribute of table 1) may be represented in the matching metastructure as relationship object 2 1272, which may reference schema object 1 1262 and schema object 3 1266. Similarly, the association 1247 between table 1 1244 and table 2 1250 (e.g. table 1 and table 2 linked by foreign keys) may be represented in the matching metastructure as relationship object 3 1274, which may reference schema object 1 1262 and schema object 4 1268. A relationship object 1270, 1272, 1274 may be implemented similar to the following example code:

```
public class JpaeSchemaEdge {
    @Id
    @Column(length=2000)
    public String uri;
    public String rootUri;
    public String schemaEdgeCode;
```

```
    public String schemaEdgeName;
    public SchemaEdgeType schemaEdgeType;
    @Column(length=2000)
    public String source_uri;
    @Column(length=2000)
    public String target_uri;
    @Column(length=2000)
    public String schema_uri;
}
public class JpaeRelationship extends JpaeSchemaNode{
    public Cardinality entityACardinality;
    public Cardinality entityBCardinality;
}
public class JpaePDMRelationship extends JpaeRelationship {
}
public class JpaeCDMRelationship extends JpaeRelationship {
    public boolean isADependent;
    public boolean isBDependent;
}
```

A virtual schema object 1276, as described herein for the matching metastructure) may reference schema object 1 1262 and schema object 4 1268, aggregating the two schema objects together as a single object in the virtual schema object. A virtual schema object 1276 may be implemented similar to the schema object example code.

Table A 1254 may be represented in the matching metastructure by schema object A 1282, which may be a schema object as described for the matching metastructure herein.

An alignment 1284 may represent or define the matching between database 1 1242 and database 2 1252, such as mapping 1249. The alignment 1284 may reference the data schema 1 1260 and the data schema 2 1280. An alignment object 1284 may be implemented similar to the following example code:

```
    public class JpaeSchemaAlignment{
        @Id
        @Column(length=4000)
        public String schemaAlignmentUri;
        public String versionCode;
        @Column(length=2000)
        public String sourceUri;
        @Column(length=2000)
        public String targetUri;
        public String description;
    }
```

The mapping 1249 may be represented in the matching metastructure as the mapping object 1 1286, which may reference schema object 1 1262 in data schema 1 1260 and schema object A 1282 in data schema 2 1280. A mapping object 1286 may be implemented similar to the following example code:

```
    public class JpaeCorrespondence{
        @Id
        @Column(length=5000)
        public String correspondenceUri;
        public String versionCode;
        @Column(length=4000)
        public String schemaAlignmentUri;
        @Column(length=2000)
        public String targetNodeUri;
        @Column(length=2000)
        public String sourceSchemaUri;
        @Column(length=2000)
        public String targetSchemaUri;
        public String comment;
    }
```

```
    public class JpaeCorrespondenceNode{
        @Id
        @GeneratedValue(strategy = GenerationType.AUTO)
        public UUID ID;
        public String versionCode;
        public String comment;
        @Column(length=4000)
        public String inputNodeUri;
        @Column(length=4000)
        public String correspondenceUri;
        @Column(length=2000)
        public String sourceSchemaUri;
        @Column(length=2000)
        public String targetSchemaUri;
    }
```

Example 13—Matching Metastructure Versioning

Figure 13:
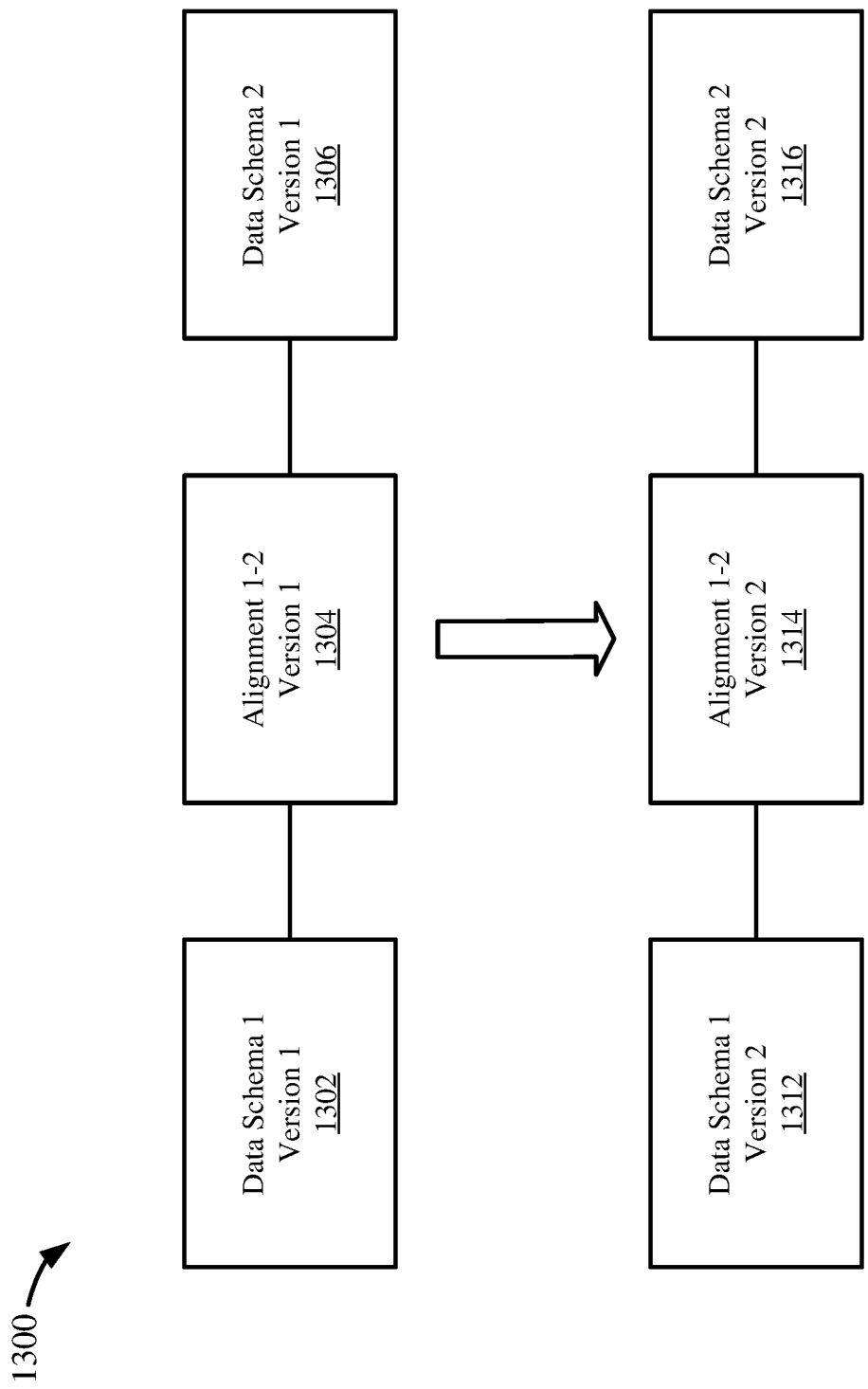
FIG. 13 depicts version transformation of a matching metastructure schema.

FIG. 13 depicts a version transformation example 1300 for a matching metastructure schema. A data schema 1 1302 may be version 1 and a data schema 2 1306 may be version 1. An alignment 1-2 1304 may align (e.g. map) the version 1 data schema 1 1302 and the version 1 data schema 2 1306. The alignment 1-2 1304 may be version 1. Generally, during the lifecycle of the data schemas 1302, 1306 and the alignment 1304, the same versions remain linked. Thus, a given version of a data schema (e.g. version 1 of data schema 1 1302) links to a given version of an alignment (e.g. version 1 of alignment 1-2 1304), which links to a given version of the second data schema (e.g. version 1 of the data schema 2 1306).

Changes to any of the data schema 1 1302, data schema 2 1306, or the alignment 1-2 1304 may prompt a version change (e.g. increase). Generally, the version change applies to all linked data schemas 1302, 1306 and alignments 1304, regardless of whether that schema or alignment was changed. Thus, scenarios where no changes were made to the other linked data schemas or alignments still result in changes to their versions if the version changed for a linked data schema or alignment. For example, if Data Schema 2 changes from version 1 1306 to version 2 1316, both data schema 1 and alignment 1-2 will change from version 1 1302, 1304 to version 2 1312, 1314 even if neither data schema 1 nor alignment 1-2 changed. Thus, if one or more of the data schema 1 1302, data schema 2 1306, or the alignment 1-2 1304 changes, all 1302, 1304, 1306 will have their versions increased (even if that particular data schema or alignment did not, itself, change), becoming version 2 of data schema 1 1312 linked to version 2 of alignment 1-2 1314 linked to version 2 of data schema 2 1316.

Increasing a version may include creating copies of the appropriate data schemas 1302, 1306 and alignment 1304 and increasing their version numbers, resulting in data schemas 1312, 1316 and alignment 1314. Increasing a version may also include changing one or more properties or objects of the data schemas or alignment 1302, 1304, 1306. Increasing a version may include re-mapping the data schemas 1302, 1306, which may be done through an automatic or semi-automatic process.

Generally, by maintaining consist versions of linked data schemas and alignments, the full lifecycle management of the matching metastructure may be more accurately maintained and performed.

Example 14—Matching Metastructure Conversion

Figure 14A:
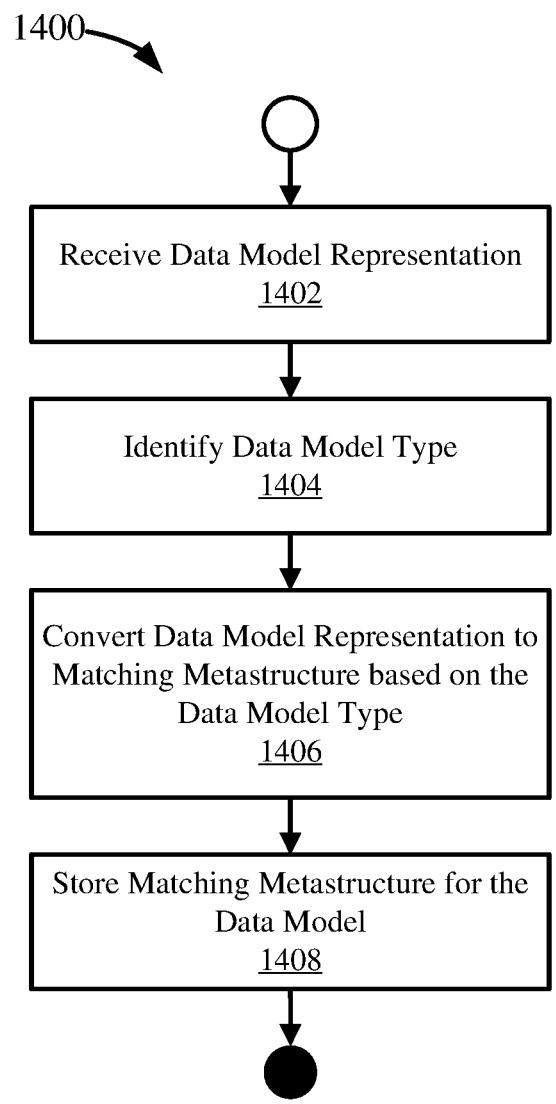
FIG. 14A is a flowchart illustrating a process for data model conversion to a metastructure format or schema.

FIG. 14A is a flowchart illustrating a process 1400 for data model conversion to a matching metastructure format or schema.

A data model representation may be obtained or received at 1402. Receiving the data model representation at 1402 may include receiving an identifier for the data model representation, which may be used to access the data model representation (e.g., in a data dictionary). A location value may be provided along with the data model identifier, in some cases, such as a file path or a URI. In other embodiments, receiving the data model representation at 1402 may include receiving an indicator to access a database to obtain the data model representation. In other embodiments, the data model representation itself may be received at 1402. For example, a schema or a graph representation of the data model may be received (or otherwise obtained) at 1402.

In some embodiments, obtaining a data model representation at 1402 may include transforming a schema or data model into a graph representation, which may then be used as the data model representation in process 1400. For example, in some cases it may be more efficient to convert a graph representation of a data model into the matching metastructure and convert the original data model representation into a graph representation, than to convert the original graph representation directly into the matching metastructure format.

A type may be identified at 1404 for the data model received at 1402. In some embodiments, the type may be received along with the data model representation at 1402. For example, a type indicator may be provided to the process at 1402, such as whether the type is a database schema or an API schema. In other embodiments, a type may be determined at 1404 based on the source of the data model representation. For example, a data model representation obtained from a database may indicate the data model is a database schema. In other embodiments, the data model representation may be analyzed 1404 to determine the data model type. For example, a data model representation may contain a field or metadata indicating the type of data model. In other cases, the type may be identified based on one or more structural components of the data model representation. For example, tables may be detected as structural components of the data model representation, which may be used to identify the data model representation as a database schema.

The data model representation may be converted to the matching metastructure at 1406 (e.g., the metastructure having a format that allows schemas to be converted to a "generic" or common metastructure that provides a common format for comparing/aligning data models). The converting may be based on the data model type determined at 1406. For example, a different algorithm or process may be used to analyze different data model types (e.g. different adapters or plug-ins).

Converting may include generating a data schema for the data model representation, and setting the data schema type to the data model type identified at 1404. One or more properties of the data schema may be set as well. Converting may further include generating schema objects for structural components (e.g. database tables, columns, API functions, function arguments, etc.) identified in the data model representation. Structural components of the data model representation may be traversed or iterated through, with a schema object created for each structural component, until all structural components have a corresponding schema object created. One or more properties of the schema objects may be set as well based on their corresponding structural components in the data model representation.

Converting may further include generating relationship objects for links, connections, or associations between structural components (e.g. foreign keys between database tables, columns as attributes of database tables, call between API functions, variables as function arguments, etc.) identified in the data model representation. Links, connections, or associations between structural components in the data model representation may be traversed or iterated through, with a relationship object created for each link, connection, or association, until all such links, connections, or associations have a corresponding relationship object created. One or more properties of the relationship objects may be set as well based on their corresponding link, connection, or association in the data model representation. Converting may further include generating one or more virtual schema objects, based on one or more of the generated schema objects, which may include setting one or more properties of the virtual schema objects.

Converting at 1406 may include generating one or more values lists for value definitions for structural components in the data model representation. Generating a value list may include retrieving the value options from the data model representation and storing them as values in a value list in the matching metastructure schema. Generating a value list may further include associating the value list with one or more schema objects generated at 1406.

The matching metastructure for the data model representation may be stored at 1408. In some embodiments, the respective data schema, schema objects, and other components of the matching metastructure may be stored as they are generated at 1406 as part of the converting. In other embodiments, the complete matching metastructure for the data model representation may be stored once all schema objects and other components of the matching metastructure are generated as part of the converting. Storing may include writing the matching metastructure for the data model to a memory or other data storage, such as in a database or matching metastructure representation file, as described herein. In other embodiments, the matching metastructure may be stored as metadata objects or objects in a metadata schema for the data model, or as instances of object-oriented classes for the matching metastructure, as described herein.

Figure 14B:
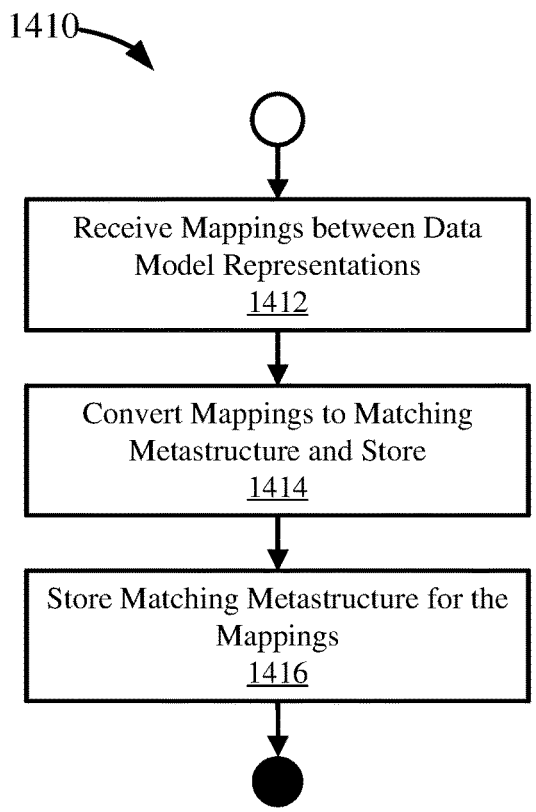
FIG. 14B is a flowchart illustrating a process for data model mapping conversion to a matching metastructure format or schema.

FIG. 14B is a flowchart illustrating a process 1410 for data model mapping conversion to a matching metastructure format or schema. That is, a mapping may have been created using a process other than that described herein, and such mapping can be converted from the format generated by the other process to the matching metastructure format or schema by the process 1410. The process 1410 for data model mapping conversion may be integrated with the process 1400 for data model conversion to a matching metastructure format or schema.

One or more mappings between data models may be obtained or received at 1412. The mappings may be received from a data model alignment or mapping process, such as may be accomplished automatically or semi-automatically by executing, calling, or otherwise accessing the schema alignment technologies disclosed in the SCHEMA ALIGNMENT AND STRUCTURAL DATA MAPPING OF DATABASE OBJECTS patent application filed concurrently herewith, having inventors Sandra Bracholdt, Volker Saggau, and Jan Portisch, and incorporated herein by reference.

In other embodiments, receiving the data model mappings at 1412 may include receiving an identifier for a representation of the data model mappings, which may be used to access a file storing the data model mappings. A location value may be provided along with the data model mappings identifier, in some cases. In other embodiments, receiving the data model mappings at 1412 may include receiving an indicator to access a database to obtain the data model mappings. In other embodiments, a representation (e.g. file) of the data model mappings may itself be received at 1412.

The data model mappings may be converted to the matching metastructure at 1414. Converting the mappings may include generating an alignment in the matching metastructure, as described herein, for the two data models mapped to each other. Generating the alignment may include setting one or more properties of the alignment. Converting the mappings may further include generating mapping objects in the matching metastructure, as described herein, for the received mappings, which may include iterating over or traversing the received mappings to generate a mapping object for each of the respective mappings between the data models. In some embodiments, the mappings may be received iteratively, and so each mapping object may be generated as the mapping is received or determined. Generating the alignment and mapping objects may include setting one or more of the properties of the alignment or mapping objects as described herein.

The matching metastructure for the mappings may be stored at 1416, similar to step 1408 in process 1400 shown in FIG. 14A.

Figure 14C:
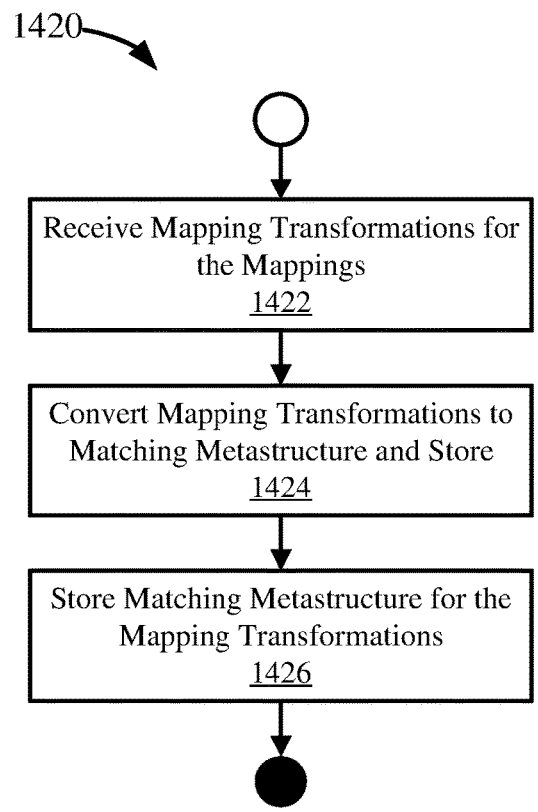
FIG. 14C is a flowchart illustrating a process for mapping transformation conversion to a matching metastructure format or schema.

FIG. 14C is a flowchart illustrating a process 1420 for mapping transformation conversion to a matching metastructure format or schema. The process 1420 for mapping transformation conversion is generally used in conjunction with matching metastructure alignment and mapping objects, as described herein. The process 1420 for mapping transformation conversion may be integrated with the process 1410 for data model mapping conversion to a matching metastructure format or schema.

One or more mapping transformations for mappings between data models may be obtained or received at 1422. A mapping transformation may be used to transform a first data model of a mapping to a second, mapped data model of the mapping. In at least some cases, a separate mapping transformation may be needed for converting the second mapped data model to the first data model. The mapping transformations may be similar to the recursive rule language rules as described herein, and may be received or obtained from processes for recursive rule language generation or retrieval as described herein. Receiving the mappings transformations at 1422 may be similar to step 1412 in process 1410 shown in FIG. 14B.

The data model mapping transformations may be converted to the matching metastructure at 1424. Converting the mapping transformations may include generating rule stacks in the matching metastructure, as described herein, for the mapping transformations. Generating a rule stack may include generating one or more rules, rule building blocks, and consequences based on the mapping transformation, or as described herein for recursive rule language rules. Generating the rule stack and its rules, rule building blocks and consequences may include setting one or more of the properties of the rule stack, rules, rule building blocks and consequences as described herein.

The matching metastructure for the mapping transformations may be stored at 1426, similar to step 1408 in process 1400 shown in FIG. 14A.

Example 15—Matching Metastructure Module Environments

Figure 15A:
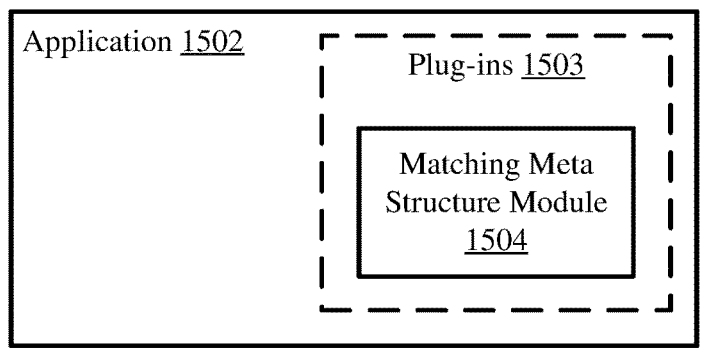
FIG. 15A is a schematic diagram depicting an application environment for a matching metastructure module.

FIG. 15A is a schematic diagram depicting an application environment for a matching metastructure module 1504, which may provide metastructure conversion and analysis functionality as described herein. An application 1502, such as a software application running in a computing environment, may have one or more plug-ins 1503 (or add-ins or other software extensions to programs) that add functionality to, or otherwise enhance, the application. The matching metastructure module 1504 may be integrated with the application 1502; for example, the matching metastructure module may be integrated as a plug-in. The matching metastructure module 1504 may add functionality to the application 1502 for metastructure conversion and analysis, which may be displayed in a user interface or otherwise provided to a user. For example, the application 1502 may be a database or data modeling application, or a database management application, and the matching metastructure module 1504 may be integrated with the database or data management application to provide metastructure conversion and analysis functionality.

Figure 15B:
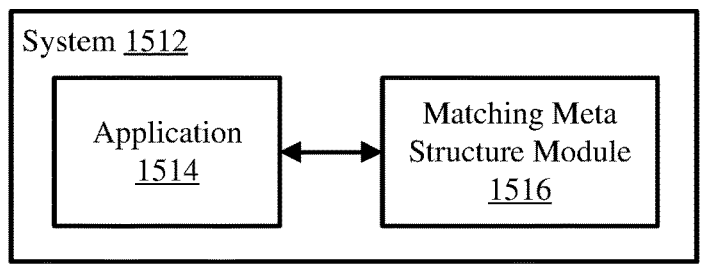
FIG. 15B is a schematic diagram depicting a system environment for a matching metastructure module.

FIG. 15B is a schematic diagram depicting a system environment for a matching metastructure module 1516, which may provide metastructure conversion and analysis functionality as described herein. The matching metastructure module 1516 may be integrated with a computer system 1512. The computer system 1512 may include an operating system, or otherwise be a software platform, and the matching metastructure module 1516 may be an application or service running in the operating system or platform, or the matching metastructure module may be integrated within the operating system or platform as a service or functionality provided through the operating system or platform. The system 1512 may be a server or other networked computer or file system. Additionally or alternatively, the matching metastructure module 1516 may communicate with and provide metastructure conversion and analysis functionality, as described herein, to one or more applications 1514, such as database, data modeling, or database management applications, in the system 1512.

Figure 15C:
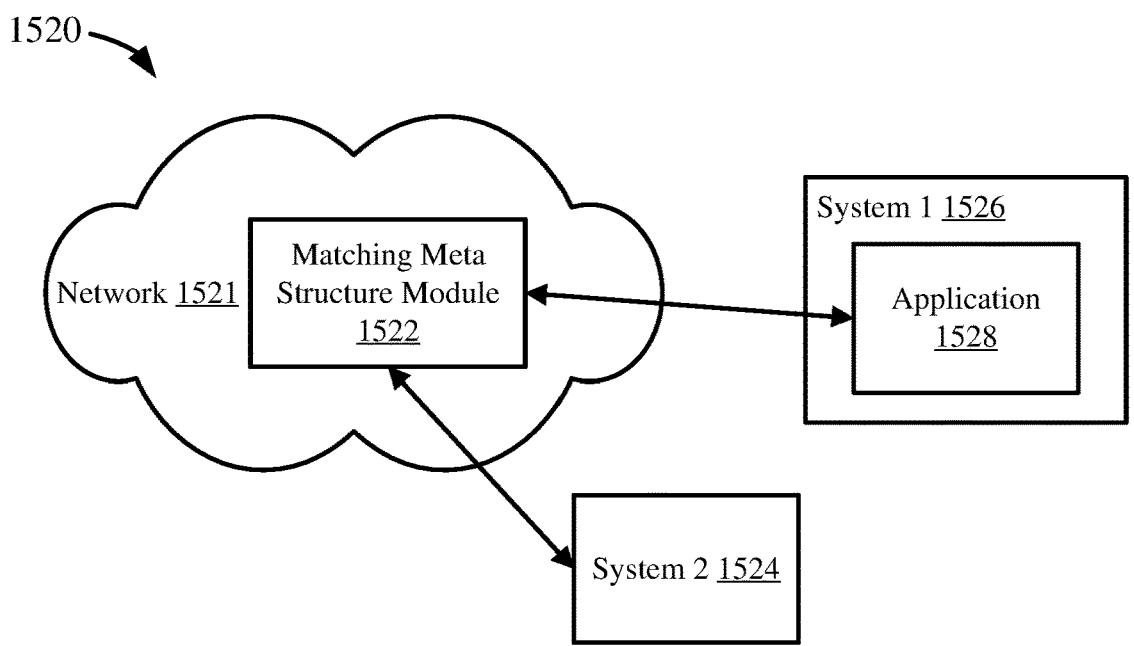
FIG. 15C is a schematic diagram depicting a network environment for a matching metastructure module.

FIG. 15C is a schematic diagram depicting a network environment 1520 for a matching metastructure module 1522, which may provide metastructure conversion and analysis functionality as described herein. The matching metastructure module 1522 may be available on a network 1521, or integrated with a system (such as from FIG. 15B) on a network. Such a network 1521 may be a cloud network or a local network. The matching metastructure module 1522 may be available as a service to other systems on the network 1521 or that have access to the network (e.g., may be on-demand software or SaaS). For example, system 2 1524 may be part of, or have access to, the network 1521, and so can utilize metastructure conversion and analysis functionality from the matching metastructure module 1522. Additionally, system 1 1526, which may be part of or have access to the network 1521, may have one or more applications, such as application 1528, that may utilize metastructure conversion and analysis functionality from the matching metastructure module 1522.

In these ways, the matching metastructure module 1504, 1516, 1522 may be integrated into an application, a system, or a network, to provide metastructure conversion and analysis functionality as described herein.

Example 16—Additional Matching Metastructure Processes

Figure 16A:
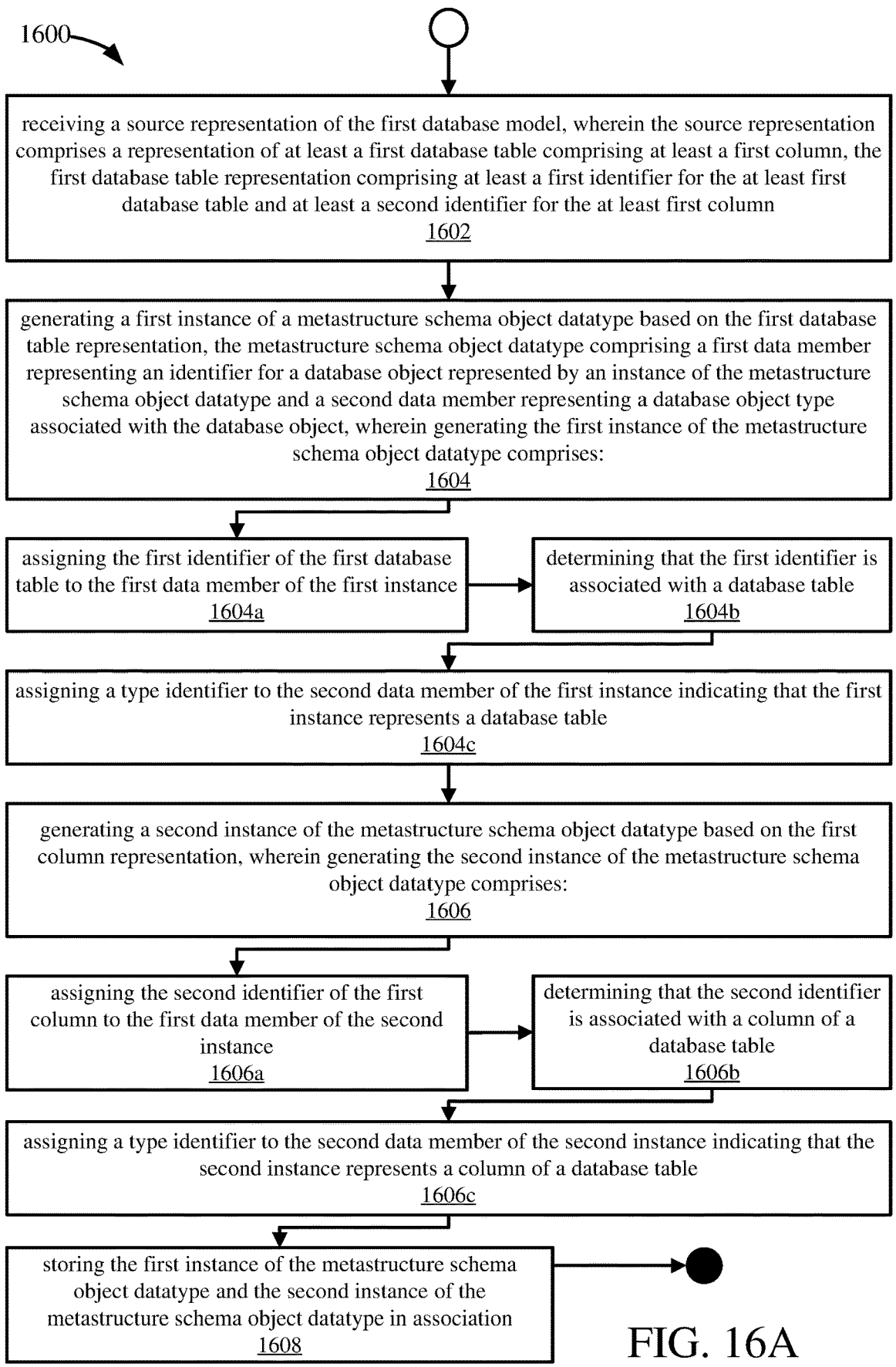
FIG. 16A illustrates a process for generating a metadata representation of a first database model.

FIG. 16A illustrates a process 1600 for generating a metadata representation of a first database model. The processes 1600, 1620, 1640 may be implemented by one or more computing devices comprising at least one hardware processor and one or more tangible memories coupled to the at least one hardware processor.

A source representation of the first database model may be received at 1602. The source representation may include a representation of at least a first database table including at least a first column, the first database table representation including at least a first identifier for the at least first database table and at least a second identifier for the at least first column.

A first instance of a metastructure schema object datatype may be generated at 1604 based on the first database table representation. The metastructure schema object datatype may include a first data member representing an identifier for a database object represented by an instance of the metastructure schema object datatype and a second data member representing a database object type associated with the database object. Generating the first instance of the metastructure schema object datatype may include at 1604*a* assigning the first identifier of the first database table to the first data member of the first instance. Generating the first instance of the metastructure schema object datatype may include at 1604*b* determining that the first identifier is associated with a database table. Generating the first instance of the metastructure schema object datatype may include at 1604*c* assigning a type identifier to the second data member of the first instance indicating that the first instance represents a database table.

A second instance of the metastructure schema object datatype may be generated at 1606 based on the first column representation. Generating the second instance of the metastructure schema object datatype may include at 1606*a* assigning the second identifier of the first column to the first data member of the second instance. Generating the second instance of the metastructure schema object datatype may include at 1606*b* determining that the second identifier is associated with a column of a database table. Generating the second instance of the metastructure schema object datatype may include at 1606*c* assigning a type identifier to the second data member of the second instance indicating that the second instance represents a column of a database table.

The first instance of the metastructure schema object datatype and the second instance of the metastructure schema object datatype may be stored at 1608 in association.

Figure 16B:
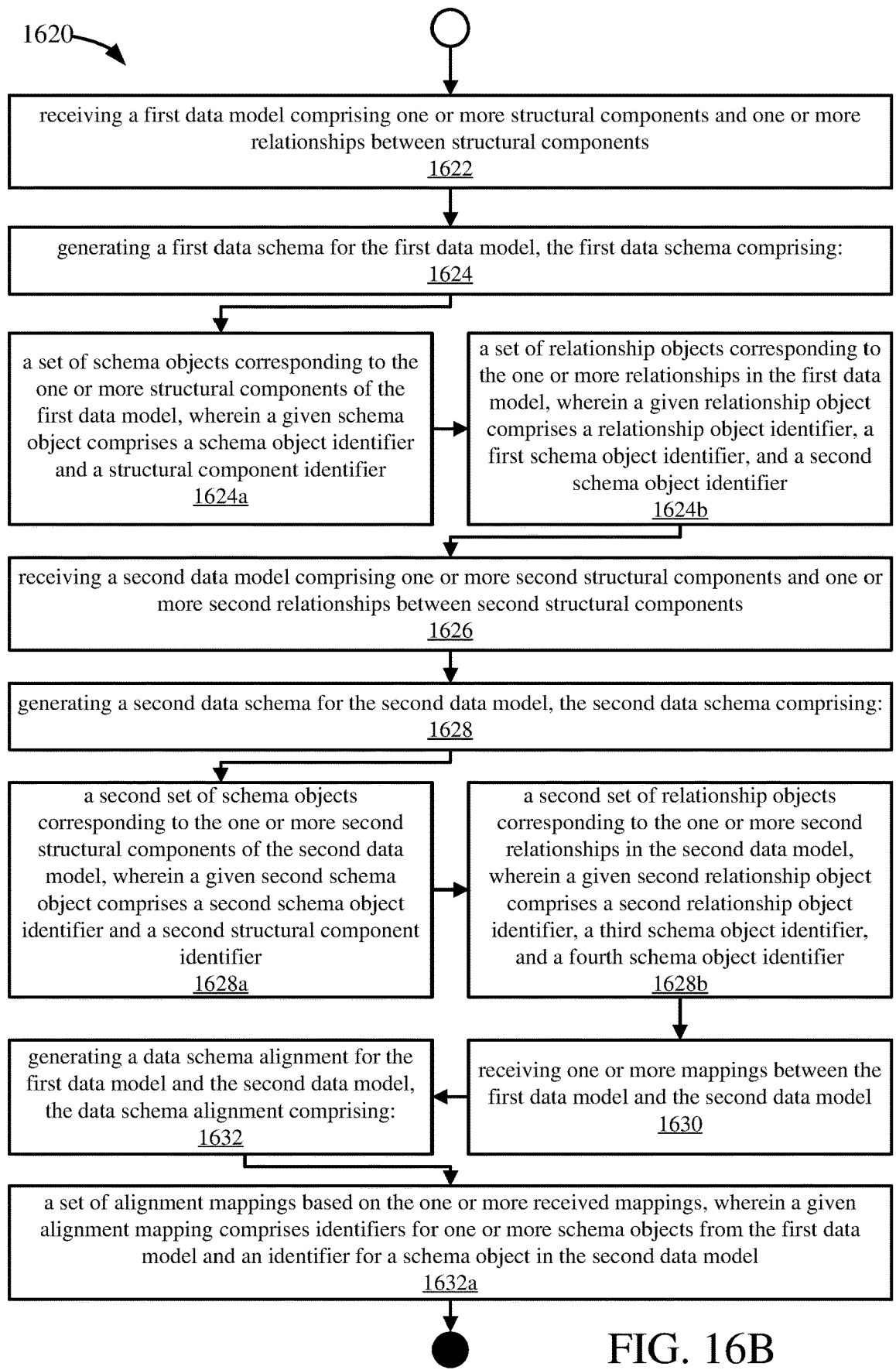
FIG. 16B illustrates a process for maintaining data model mappings.

FIG. 16B illustrates a process 1620 for maintaining data model mappings. A first data model may be received at 1622. The first data model may include one or more structural components and one or more relationships between structural components. A first data schema for the first data model may be generated at 1624. The first data schema may include at 1624*a* a set of schema objects corresponding to the one or more structural components of the first data model. A given schema object may include a schema object identifier and a structural component identifier. The first data schema may include at 1624*b* a set of relationship objects corresponding to the one or more relationships in the first data model. A given relationship object may include a relationship object identifier, a first schema object identifier, and a second schema object identifier.

A second data model may be received at 1626. The second data model may include one or more second structural components and one or more second relationships between second structural components. A second data schema for the second data model may be generated at 1628. The second data schema may include at 1628*a* a second set of schema objects corresponding to the one or more second structural components of the second data model. A given second schema object may include a second schema object identifier and a second structural component identifier. The second data schema may include at 1628*b* a second set of relationship objects corresponding to the one or more second relationships in the second data model. A given second relationship object may include a second relationship object identifier, a third schema object identifier, and a fourth schema object identifier.

One or more mappings between the first data model and the second data model may be received at 1630. A data schema alignment may be generated at 1632 for the first data model and the second data model. The data schema alignment may include at 1632*a* a set of alignment mappings based on the one or more received mappings. A given alignment mapping may include identifiers for one or more schema objects from the first data model and an identifier for a schema object in the second data model.

Figure 16C:
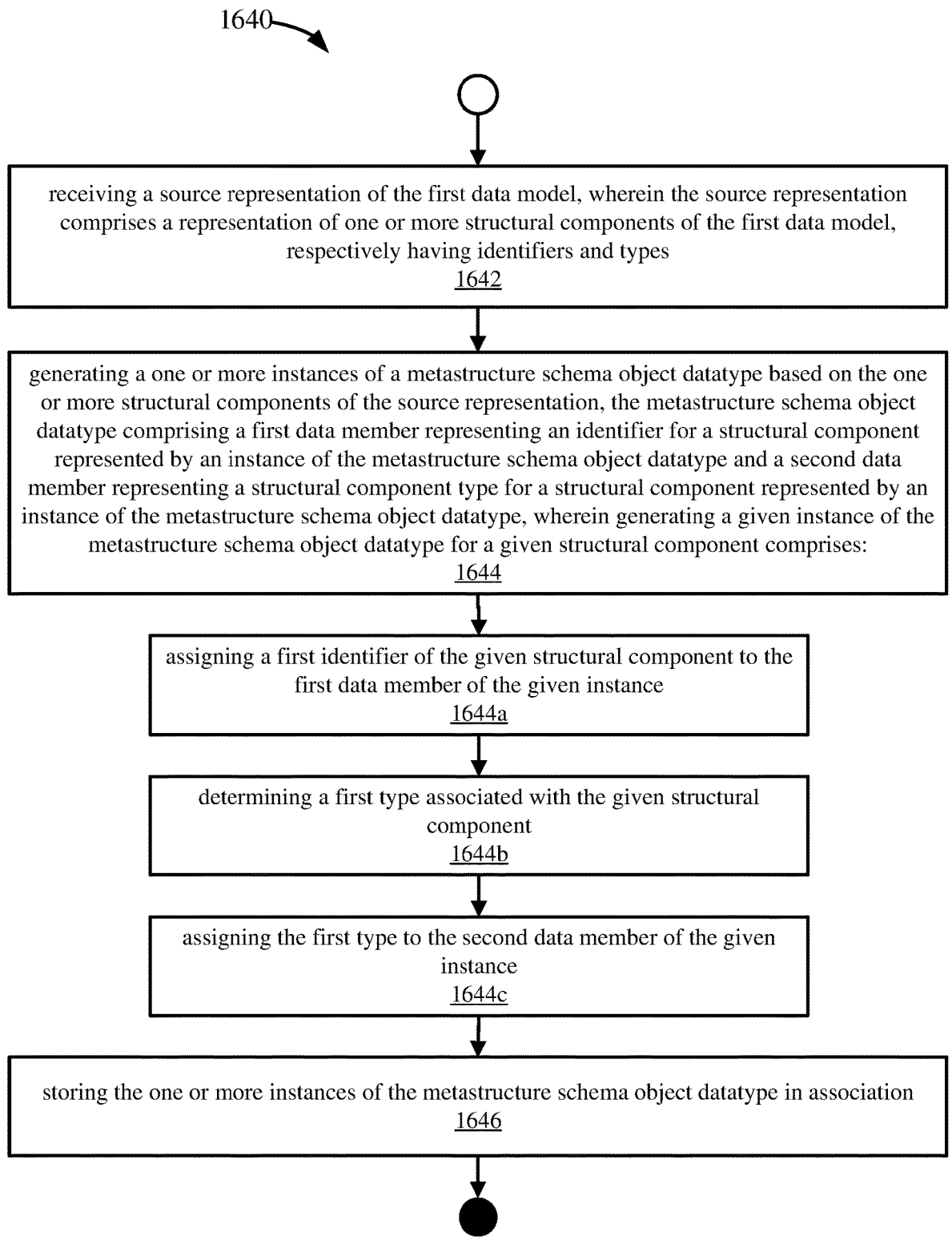
FIG. 16C illustrates a process for generating a metadata representation of a first data model.

FIG. 16C illustrates a process 1640 for generating a metadata representation of a first data model. The processes 1600, 1620, 1640 may be implemented by one or more computing devices comprising at least one hardware processor and one or more tangible memories coupled to the at least one hardware processor.

A source representation of the first data model may be received at 1642. The source representation may include a representation of one or more structural components of the first data model, respectively having identifiers and types. One or more instances of a metastructure schema object datatype may be generated at 1644 based on the one or more structural components of the source representation. The metastructure schema object datatype may include a first data member representing an identifier for a structural component represented by an instance of the metastructure schema object datatype and a second data member representing a structural component type for a structural component represented by an instance of the metastructure schema object datatype.

Generating a given instance of the metastructure schema object datatype for a given structural component may include at 1644*a* assigning a first identifier of the given structural component to the first data member of the given instance. Generating a given instance of the metastructure schema object datatype for a given structural component may include at 1644*b* determining a first type associated with the given structural component. Generating a given instance of the metastructure schema object datatype for a given structural component may include at 1644*c* assigning the first type to the second data member of the given instance.

The one or more instances of the metastructure schema object datatype may be stored at 1646 in association.

Example 17—Computing Systems

Figure 17:
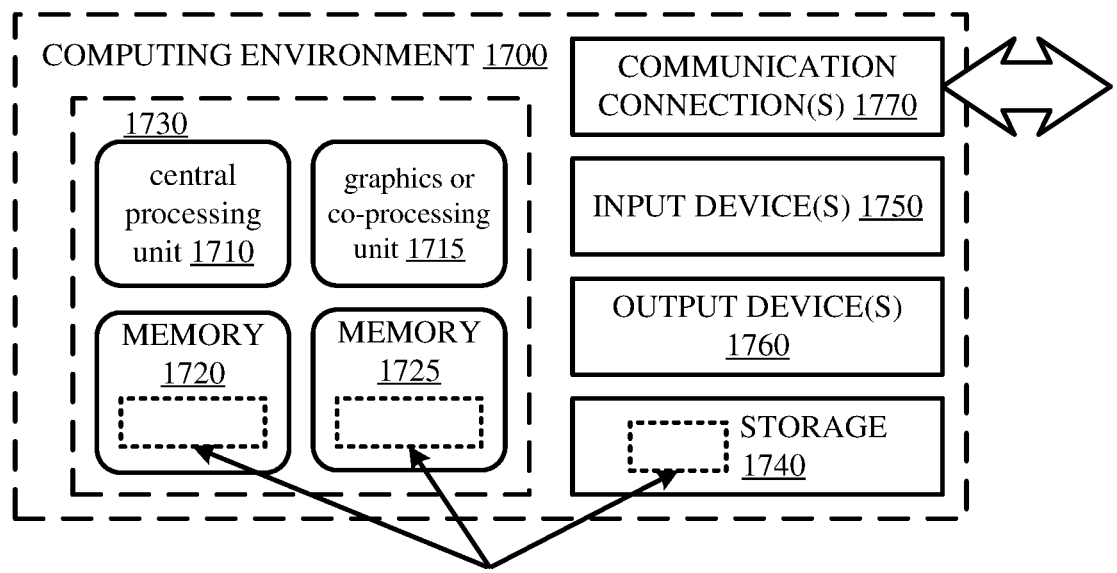
FIG. 17 is a diagram of an example computing system in which described embodiments can be implemented.

FIG. 17 depicts a generalized example of a suitable computing system 1700 in which the described innovations may be implemented. The computing system 1700 is not intended to suggest any limitation as to scope of use or functionality of the present disclosure, as the innovations may be implemented in diverse general-purpose or special-purpose computing systems.

With reference to FIG. 17, the computing system 1700 includes one or more processing units 1710, 1715 and memory 1720, 1725. In FIG. 17, this basic configuration 1730 is included within a dashed line. The processing units 1710, 1715 execute computer-executable instructions, such as for implementing components of the processes of FIGS. 8-10, 14A-C, and 16A-C, the systems of FIGS. 4, 11B and 15A-C, or the databases, data representations, rules and examples of FIGS. 1-3, 5-7, 11A, 12A-C, and 13. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 17 shows a central processing unit 1710 as well as a graphics processing unit or co-processing unit 1715. The tangible memory 1720, 1725 may be volatile memory (e.g., registers, cache, RAM), non-volatile memory (e.g., ROM, EEPROM, flash memory, etc.), or some combination of the two, accessible by the processing unit(s) 1710, 1715. The memory 1720, 1725 stores software 1780 implementing one or more innovations described herein, in the form of computer-executable instructions suitable for execution by the processing unit(s) 1710, 1715. The memory 1720, 1725, may also store settings or settings characteristics, databases, data sets, interfaces, displays, or data models or representations shown in FIGS. 1-3, 5-7, 11A, 12A-C, and 13, systems shown in FIGS. 4, 11B and 15A-C, or the steps of the processes shown in FIGS. 8-10, 14A-C, and 16A-C.

A computing system 1700 may have additional features. For example, the computing system 1700 includes storage 1740, one or more input devices 1750, one or more output devices 1760, and one or more communication connections 1770. An interconnection mechanism (not shown) such as a bus, controller, or network interconnects the components of the computing system 1700. Typically, operating system software (not shown) provides an operating environment for other software executing in the computing system 1700, and coordinates activities of the components of the computing system 1700.

The tangible storage 1740 may be removable or non-removable, and includes magnetic disks, magnetic tapes or cassettes, CD-ROMs, DVDs, or any other medium which can be used to store information in a non-transitory way and which can be accessed within the computing system 1700. The storage 1740 stores instructions for the software 1780 implementing one or more innovations described herein.

The input device(s) 1750 may be a touch input device such as a keyboard, mouse, pen, or trackball, a voice input device, a scanning device, or another device that provides input to the computing system 1700. The output device(s) 1760 may be a display, printer, speaker, CD-writer, or another device that provides output from the computing system 1700.

The communication connection(s) 1770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc., that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general purpose program, such as one or more lines of code in a larger or general purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 18—Cloud Computing Environment

Figure 18:
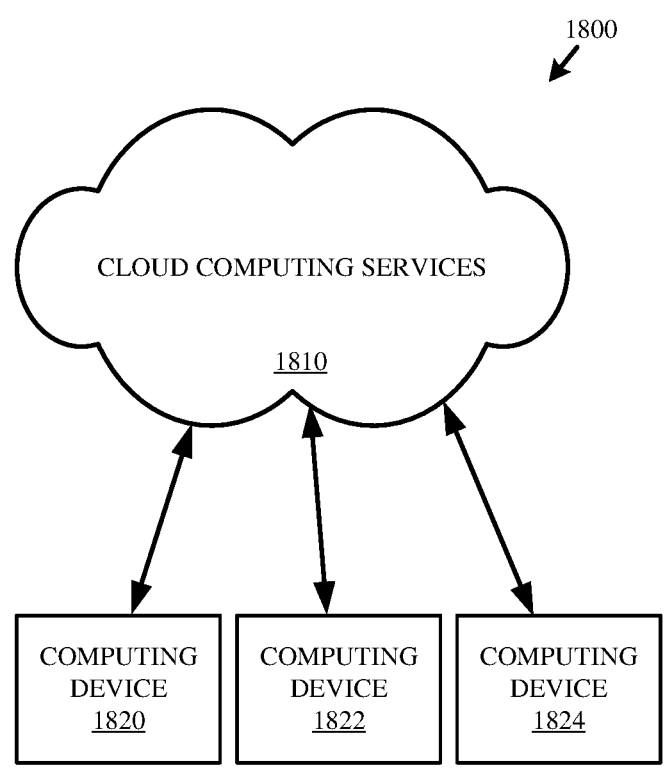
FIG. 18 is an example cloud computing environment that can be used in conjunction with the technologies described herein.

FIG. 18 depicts an example cloud computing environment 1800 in which the described technologies can be implemented. The cloud computing environment 1800 comprises cloud computing services 1810. The cloud computing services 1810 can comprise various types of cloud computing resources, such as computer servers, data storage repositories, networking resources, etc. The cloud computing services 1810 can be centrally located (e.g., provided by a data center of a business or organization) or distributed (e.g., provided by various computing resources located at different locations, such as different data centers and/or located in different cities or countries).

The cloud computing services 1810 are utilized by various types of computing devices (e.g., client computing devices), such as computing devices 1820, 1822, and 1824. For example, the computing devices (e.g., 1820, 1822, and 1824) can be computers (e.g., desktop or laptop computers), mobile devices (e.g., tablet computers or smart phones), or other types of computing devices. For example, the computing devices (e.g., 1820, 1822, and 1824) can utilize the cloud computing services 1810 to perform computing operations (e.g., data processing, data storage, and the like).

Example 19—Implementations

Although the operations of some of the disclosed methods are described in a particular, sequential order for convenient presentation, it should be understood that this manner of description encompasses rearrangement, unless a particular ordering is required by specific language set forth. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 17, computer-readable storage media include memory 1720 and 1725, and storage 1740. The term computer-readable storage media does not include signals and carrier waves. In addition, the term computer-readable storage media does not include communication connections (e.g., 1770).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. It should be understood that the disclosed technology is not limited to any specific computer language or program. For instance, the disclosed technology can be implemented by software written in C++, Java, Perl, JavaScript, Python, Ruby, ABAP, SQL, Adobe Flash, or any other suitable programming language, or, in some examples, markup languages such as html or XML, or combinations of suitable programming languages and markup languages. Likewise, the disclosed technology is not limited to any particular computer or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
   at least one hardware processor;
   at least one memory coupled to the at least one hardware processor; and
   one or more computer-readable storage media storing computer-executable instructions that, when executed, cause the computing system to perform operations comprising:
      receiving a source representation of a first database model, wherein the source representation comprises a first database table representation of at least a first database table, the at least a first database table comprising at least a first column, the first database table representation comprising at least a first identifier for the at least a first database table and at least a second identifier for the at least a first column;
      generating a first instance of a metastructure schema object datatype based at least in part on the first database table representation, the metastructure schema object datatype comprising a first data member representing an identifier for a database object represented by an instance of the metastructure schema object datatype and a second data member representing a database object type associated with the database object, wherein generating the first instance of the metastructure schema object datatype comprises:
         assigning the at least a first identifier for the at least a first database table to the first data member of the first instance;
         determining that the at least a first identifier is associated with a database table; and
         assigning a type identifier to the second data member of the first instance indicating that the first instance represents a database table;
      generating a second instance of the metastructure schema object datatype based on a representation of the at least a first column, wherein generating the second instance of the metastructure schema object datatype comprises:
         assigning the at least a second identifier for the at least a first column to the first data member of the second instance;
         determining that the at least a second identifier is associated with a column of a database table; and
         assigning a type identifier to the second data member of the second instance indicating that the second instance represents a column of a database table; and
      storing the first instance of the metastructure schema object datatype and the second instance of the metastructure schema object datatype in association.

2. The computing system of claim 1, the operations further comprising:
generating an instance of metastructure relationship object datatype based on the first database table representation and the representation of the at least a first column, the metastructure relationship object datatype comprising a first data member representing an identifier for a first database object represented by an instance of the metadata structure schema object datatype, a second data member representing a second identifier for a second database object represented by an instance of the metadata structure schema object datatype, and a third data member representing a relationship type for the first database object and the second database object, wherein generating the instance of metastructure relationship object datatype comprises:
assigning a first identifier of the first instance of the metastructure schema object datatype to the first data member of the first instance of the metastructure relationship object datatype;
assigning a second identifier of the second instance of the metastructure schema object datatype to the second data member of the first instance of the metastructure relationship object datatype;
determining that the first identifier is associated with a database table;
determining that the second identifier is associated with a column of the database table; and
assigning a type identifier to the third data member of the instance of the metastructure relationship object datatype indicating the second instance of the metastructure schema object datatype is a column of the first instance of the metastructure schema object datatype; and
storing the instance of the metastructure relationship object datatype in association with the first instance and second instance of the metastructure schema object datatype.

3. The computing system of claim 1, the operations further comprising:
generating a third instance of the metastructure schema object datatype based on a second database table in the source representation, wherein the second database table is associated with the at least a first database table in the source representation, wherein generating the third instance of the metastructure schema object datatype comprises:
assigning a third identifier of the second database table to the first data member of the third instance;
determining that the third identifier is associated with a database table; and
assigning a type identifier to the second data member of the third instance indicating that the second instance represents a column of a database table;
generating an instance of metastructure relationship object datatype based on the first database table representation and the representation of the at least a first column, the metastructure relationship object datatype comprising a first data member representing an identifier for a database object represented by an instance of the metadata structure schema object datatype, a second data member representing a second identifier for a second database object represented by an instance of the metadata structure schema object datatype, and a third data member representing a relationship type for the first database object and the second database object, wherein generating the instance of metastructure relationship object datatype comprises:
assigning a first identifier of the first instance of the metastructure schema object datatype to the first data member of the first instance of the metastructure relationship object datatype;
assigning a second identifier of the third instance of the metastructure schema object datatype to the second data member of the instance of the metastructure relationship object datatype;
determining that the first identifier is associated with a database table;
determining that the second identifier is associated with a column of the database table; and
assigning a type identifier to the third data member of the instance of the metastructure relationship object datatype indicating the first instance of the metastructure schema object datatype is in association with the second instance of the metastructure schema object datatype; and
storing the instance of the metastructure relationship object datatype and the third instance of the metastructure schema object datatype in association with the first instance and second instance of the metastructure schema object datatype.

4. The computing system of claim 1, the operations further comprising:
generating a first instance of a metastructure virtual schema object datatype based on the first instance of the metastructure schema object datatype, the metastructure virtual schema object datatype comprising a first data member representing an identifier for a database object represented by the first instance of the metastructure schema object datatype, a second data member representing a database object type associated with the database object, and a third data member representing an identifier for the first instance of the metastructure schema object datatype, wherein generating the first instance of the metastructure virtual schema object datatype comprises:
assigning the at least a first identifier for the at least a first database table to the first data member of the first instance;
determining that the at least a first identifier for the at least a first database table is associated with a database table;
assigning a type identifier to the second data member of the first instance indicating that the first instance represents a database table; and
assigning the identifier for the first instance of the metastructure schema object datatype to the third data member; and
storing the first instance of the metastructure virtual schema object datatype in association with the first instance of the metastructure schema object datatype.

5. The computing system of claim 1, the operations further comprising:
generating a first instance of a metastructure virtual schema object datatype based on the first instance of the metastructure schema object datatype, the metastructure virtual schema object datatype comprising a first data member representing an identifier for a database object represented by the first instance of the metastructure schema object datatype, a second data member representing an identifier for another database object represented by the second instance of the metastructure schema object datatype, a third data member representing a database object type associated with the database object, a fourth data member representing another database object type associated with the another database object, a fifth data member representing an identifier for the first instance of the metastructure schema object datatype, and a sixth data member representing an identifier for the second instance of the metastructure schema object datatype, wherein generating the first instance of the metastructure virtual schema object datatype comprises:
    assigning the at least a first identifier for the at least a first database table to the first data member of the first instance;
    determining that the first identifier is associated with a database table;
    assigning a type identifier to the second data member of the first instance indicating that the first instance represents a database table;
    assigning the at least a second identifier for the at least a first column to the third data member of the first instance;
    determining that the at least a second identifier for the at least a first column is associated with a column of a database table;
    assigning a type identifier to the fourth data member of the first instance indicating that the second instance represents a column of the database table;
    assigning the identifier for the first instance of the metastructure schema object datatype to the fifth data member; and
    assigning the identifier for the second instance of the metastructure schema object datatype to the sixth data member; and
storing the first instance of the metastructure virtual schema object datatype in association with the first instance of the metastructure schema object datatype.

6. The computing system of claim 1, wherein the at least a first column in the at least a first database table is associated with a first set of values in the source representation, the operations further comprising:
    generating an instance of a metastructure value list datatype based on the first set of values, the metastructure value list datatype comprising a first data member representing an identifier for a database object represented by the second instance of the metastructure schema object datatype, and one or more additional data members representing values for the second instance of the metastructure schema object datatype, wherein generating the instance of the metastructure value list datatype comprises:
        assigning the identifier for the second instance of the metastructure schema object datatype representing the at least a first column to the first data member; and
        assigning the first set of values to the one or more additional data members of the instance; and
    storing the instance of the metastructure value list datatype in association with the second instance of the metastructure schema object datatype.

7. The computing system of claim 1, the operations further comprising:
    generating a first instance of a metastructure data schema datatype based on the source representation, the metastructure data schema datatype comprising a first data member representing an identifier for a data model representation and a second data member representing a data model type associated with the data model representation, wherein generating the instance of the metastructure data schema datatype comprises:
        assigning a model identifier of the source representation to the first data member of the first instance of the metastructure data schema datatype;
        determining that the source representation is associated with a database data model; and
        assigning a type identifier to the second data member of the first instance of the metastructure data schema datatype indicating that the first instance of the metastructure data schema datatype represents a database;
    storing the first instance of the metastructure data schema datatype in association with the first instance and the second instance of the metastructure schema object datatype; and
    wherein storing the first instance of the metastructure schema object datatype and the second instance of the metastructure schema object datatype in association comprises:
        storing the first instance of the metastructure schema object datatype in association with the first instance of the metastructure data schema datatype; and
        storing the second instance of the metastructure schema object datatype in association with the first instance of the metastructure data schema datatype.

8. The computing system of claim 7, the operations further comprising:
    receiving a second source representation of a second database model, wherein the second source representation comprises a representation of at least a second database table, the representation of the at least a second database table comprising at least a third identifier for the at least a second database table;
    generating a second instance of the metastructure data schema datatype based on the second source representation, wherein the generating the second instance of the metastructure data schema datatype comprises:
        assigning a second model identifier of the second source representation to the first data member of the second instance of the data schema metastructure datatype;
        determining that the second source representation is associated with a second database data model; and
        assigning a second type identifier to the second data member of the second instance of the metastructure data schema datatype indicating that the second instance of the metastructure data schema datatype represents a second database;
    generating a third instance of the metastructure data schema datatype based on the representation of the at least a second database table in the second source representation;
    generating an instance of a metastructure alignment datatype based on the first instance of the metastructure data schema datatype and the second instance of the metastructure data schema datatype, the metastructure alignment datatype comprising a first data member representing an identifier for an instance of the metastructure data schema datatype, and a second data member representing an identifier for another instance of the metastructure data schema datatype, wherein the generating the instance of the metastructure alignment datatype comprises:

assigning a first identifier of the first instance of the metastructure data schema datatype to the first data member of the instance of the metastructure alignment datatype; and assigning a second identifier of the second instance of the metastructure data schema datatype to the second data member of the instance of the metastructure alignment datatype; and storing the second instance of the metastructure data schema datatype, the third instance of the metastructure data schema datatype, and the instance of the metastructure alignment datatype in association with the first instance of the metastructure data schema datatype.

9. The computing system of claim 8, the operations further comprising:

receiving mapping data for the source representation and the second source representation, wherein the mapping data comprises a first identifier for the at least a first database table in the source representation and a second identifier for the at least a second database table in the second source representation;

generating an instance of a metastructure mapping object datatype based on the mapping data, the metastructure mapping object datatype comprising a first data member representing an identifier for an instance of the metastructure schema object datatype in a first data model representation, and a second data member representing an identifier for another instance of the metastructure schema object datatype in a second data model representation, wherein generating the instance of the metastructure mapping object datatype comprises:

obtaining a source identifier for the first instance of the metastructure schema object datatype based on the first identifier in the mapping data;

assigning the source identifier for the first instance of the metastructure data schema datatype to the first data member of the instance of the metastructure mapping object datatype;

obtaining a target identifier for the third instance of the metastructure schema object datatype based on the second identifier in the mapping data; and assigning the target identifier for the third instance of the metastructure data schema datatype to the second data member of the instance of the metastructure mapping object datatype; and storing the instance of the metastructure mapping object datatype, in association with the instance of the metastructure alignment datatype.

10. The computing system of claim 9, wherein the mapping data is received from a database schema alignment process for the source representation and the second source representation.

11. The computing system of claim 9, wherein the first instance or the third instance of the metastructure data schema datatype is used instead of an instance of a metastructure virtual schema object datatype for an instance of a virtual schema object that references one or more schema objects.

12. The computing system of claim 11, wherein the instance of the metastructure virtual schema object datatype is for an instance of an aggregate virtual schema object.

13. The computing system of claim 9, the operations further comprising:

executing an ETL process transferring data from a first database represented by the first instance of the metastructure data schema datatype to the second database represented by the second instance of the metastructure data schema datatype, via the instance of the metastructure alignment datatype and the instance of the metastructure mapping object data type in association with the instance of the metastructure alignment datatype.

14. The computing system of claim 9, the operations further comprising:

generating an instance of a metastructure rule stack datatype for the instance of the metastructure mapping object, the metastructure rule stack data type comprising one or more rules, one or more rule building blocks, and one or more consequences; and, storing the instance of the metastructure rule stack datatype, in association with the instance of the metastructure a mapping object datatype.

15. The computing system of claim 14, wherein generating an instance of the metastructure rule stack data type comprises generating the one or more rules, one or more rule building blocks, and the one or more consequences, which comprises:

retrieving a data transformation specification in a domain specific language;

parsing the data transformation specification to determine at least a first rule and at least a second rule specified in the data transformation specification;

parsing the data transformation specification to determine at least a first action specified in the data transformation specification;

determining that the at least a second rule references the at least a first rule; and generating nested conditional statements representing conditions of the at least a first rule and the at least a second rule.

16. The computing system of claim 15, wherein generating the one or more rules further comprises:

determining an execution format;

compiling the nested conditional statements to the execution format; and storing the compiled nested conditional statements in execution format in association with the instance of the metastructure rule stack datatype.

17. The computing system of claim 16, the operations further comprising:

executing an ETL process transferring data from the first database represented by the first instance of the metastructure data schema datatype to the second database represented by the second instance of the metastructure data schema datatype via the instance of the metastructure alignment datatype and the instance of the metastructure mapping object in association with the instance of the metastructure alignment datatype, wherein executing the ETL process further comprises:

executing the compiled nested conditional statements in execution format to transform data in the first database for storage in the second database.

18. A method, implemented by a computing system comprising at least one hardware processor and at least one memory coupled to the at least one hardware processor, the method comprising:

receiving a source representation of a first database model, wherein the source representation comprises a first database table representation of at least a first database table comprising at least a first column, the first database table representation comprising at least a first identifier for the at least a first database table and at least a second identifier for the at least a first column;

generating a first instance of a metastructure schema object datatype based on the first database table representation, the metastructure schema object datatype comprising a first data member representing an identifier for a database object represented by an instance of the metastructure schema object datatype and a second data member representing a database object type associated with the database object, wherein generating the first instance of the metastructure schema object datatype comprises:
  assigning the at least a first identifier for the at least a first database table to the first data member of the first instance;
  determining that the at least a first identifier for the at least a first database table is associated with a database table; and
  assigning a type identifier to the second data member of the first instance indicating that the first instance represents a database table;
generating a second instance of the metastructure schema object datatype based on a representation of the at least a first column, wherein generating the second instance of the metastructure schema object datatype comprises:
assigning the at least a second identifier for the at least a first column to the first data member of the second instance;
determining that the at least a second identifier is associated with a column of a database table; and
  assigning a type identifier to the second data member of the second instance indicating that the second instance represents a column of a database table; and
storing the first instance of the metastructure schema object datatype and the second instance of the metastructure schema object datatype in association.

19. The method of claim 18, further comprising:
generating a first instance of a metastructure relationship object datatype based on the first database table representation and the representation of the at least a first column, the metastructure relationship object datatype comprising a first data member representing an identifier for a first database object represented by an instance of the metastructure schema object datatype, a second data member representing a second identifier for a second database object represented by an instance of the metastructure schema object datatype, and a third data member representing a relationship type for the first database object and the second database object, wherein generating the instance of metastructure relationship object datatype comprises:
  assigning a first identifier of the first instance of the metastructure schema object datatype to the first data member of the first instance of the metastructure relationship object datatype;
  assigning a second identifier of the second instance of the metastructure schema object datatype to the second data member of the first instance of the metastructure relationship object datatype;
  determining that the first identifier is associated with a database table;
  determining that the second identifier is associated with a column of the database table; and
  assigning a type identifier to the third data member of the instance of the metastructure relationship object datatype indicating the second instance of the metastructure schema object datatype is a column of the first instance of the metastructure schema object datatype; and storing the instance of the metastructure relationship object datatype in association with the first instance and second instance of the metastructure schema object datatype.

20. The method of claim 18, further comprising:
generating a first instance of a metastructure virtual schema object datatype based on the first instance of the metastructure schema object datatype, the metastructure virtual schema object datatype comprising a first data member representing an identifier for a database object represented by the first instance of the metastructure schema object datatype, a second data member representing a database object type associated with the database object, and a third data member representing an identifier for the first instance of the metastructure schema object datatype, wherein generating the first instance of the metastructure virtual schema object datatype comprises:
  assigning the at least a first identifier of the at least a first database table to the first data member of the first instance;
  determining that the at least a first identifier of the at least a first database table is associated with a database table;
  assigning a type identifier to the second data member of the first instance indicating that the first instance represents a database table; and
  assigning the identifier for the first instance of the metastructure schema object datatype to the third data member; and
  storing the first instance of the metastructure virtual schema object datatype in association with the first instance of the metastructure schema object datatype.

21. The method of claim 18, wherein the at least a first column in the at least a first database table is associated with a first set of values in the source representation, the method further comprising:
generating an instance of a metastructure value list datatype based on the first set of values, the metastructure value list datatype comprising a first data member representing an identifier for a database object represented by the second instance of the metastructure schema object datatype, and one or more additional data members representing values for the second instance of the metastructure schema object datatype, wherein generating the instance of the metastructure value list datatype comprises:
  assigning the identifier for the second instance of the metastructure schema object datatype representing the at least a first column to the first data member; and
  assigning the first set of values to the one or more additional data members of the instance; and
storing the instance of the metastructure value list datatype in association with the second instance of the metastructure schema object datatype.

22. The method of claim 18, further comprising:
generating an instance of a metastructure data schema datatype based on the source representation, the metastructure data schema datatype comprising a first data member representing an identifier for a data model representation and a second data member representing a data model type associated with the data model representation, wherein generating the instance of the metastructure data schema datatype comprises:

assigning a model identifier of the source representation to the first data member of the instance of the metastructure data schema datatype;
determining that the source representation is associated with a database data model; and
assigning a type identifier to the second data member of the first instance of the metastructure data schema datatype indicating that the first instance of the metastructure data schema datatype represents a database; and
storing the instance of the metastructure data schema datatype in association with the first instance and the second instance of the metastructure schema object datatype; and
wherein storing the first instance of the metastructure schema object datatype and the second instance of the metastructure schema object datatype in association comprises:
storing the first instance of the metastructure schema object datatype in association with the instance of the metastructure data schema datatype; and
storing the second instance of the metastructure schema object datatype in association with the instance of the metastructure data schema datatype.

23. One or more non-transitory computer-readable storage media comprising:
computer-executable instructions that, when executed by a computing system comprising at least one memory and at least one hardware processor coupled to the at least one memory, cause the computing system to receive a source representation of a first database model, wherein the source representation comprises a first representation of at least a first database table comprising at least a first column, the at least a first database table representation comprising at least a first identifier for the at least a first database table and at least a second identifier for the at least first column;
computer-executable instructions that, when executed by the computing system, cause the computing system to generate a first instance of a metastructure schema object datatype based on the first database table representation, the metastructure schema object datatype comprising a first data member representing an identifier for a database object represented by an instance of the metastructure schema object datatype and a second data member representing a database object type associated with the database object, wherein the computer-executable instructions that generate the first instance of the metastructure schema object datatype comprise:
computer-executable instructions that, when executed by the computing system, cause the computing system to assign the at least a first identifier of the at least a first database table to the first data member of the first instance;
computer-executable instructions that, when executed by the computing system, cause the computing system to determine that the at least a first identifier is associated with a database table; and
computer-executable instructions that, when executed by the computing system, cause the computing system to assign a type identifier to the second data member of the first instance indicating that the first instance represents a database table;
computer-executable instructions that, when executed by the computing system, cause the computing system to generate a second instance of the metastructure schema object datatype based on a representation of the at least a first column, wherein the computer-executable instructions that generate the second instance of the metastructure schema object datatype comprise:
computer-executable instructions that, when executed by the computing system, cause the computing system to assign the at least a second identifier of the at least a first column to the first data member of the second instance;
computer-executable instructions that, when executed by the computing system, cause the computing system to determine that the at least a second identifier is associated with a column of a database table; and
computer-executable instructions that, when executed by the computing system, cause the computing system to assign a type identifier to the second data member of the second instance indicating that the second instance represents a column of a database table; and
computer-executable instructions that, when executed by the computing system, cause the computing system to store the first instance of the metastructure schema object datatype and the second instance of the metastructure schema object datatype in association.

24. The one or more non-transitory computer-readable storage media of claim 23, further comprising:
computer-executable instructions that, when executed by the computing system, cause the computing system to generate at first instance of metastructure relationship object datatype based on the first database table representation and the representation of the at least a first column, the metastructure relationship object datatype comprising a first data member representing an identifier for a first database object represented by an instance of the metadata structure schema object datatype, a second data member representing a second identifier for a second database object represented by an instance of the metastructure schema object datatype, and a third data member representing a relationship type for the first database object and the second database object, wherein generating the instance of metastructure relationship object datatype comprises:
computer-executable instructions that, when executed by the computing system, cause the computing system to assign a first identifier of the first instance of the metastructure schema object datatype to the first data member of the first instance of the metastructure relationship object datatype;
computer-executable instructions that, when executed by the computing system, cause the computing system to assign a second identifier of the second instance of the metastructure schema object datatype to the second data member of the first instance of the metastructure relationship object datatype;
computer-executable instructions that, when executed by the computing system, cause the computing system to determine that the first identifier is associated with a database table;
computer-executable instructions that, when executed by the computing system, cause the computing system to determine that the second identifier is associated with a column of the database table; and
computer-executable instructions that, when executed by the computing system, cause the computing system to assign a type identifier to the third data member of the instance of the metastructure relationship object datatype indicating the second instance of the metastructure schema object datatype is a column of the first instance of the metastructure schema object datatype; and computer-executable instructions that, when executed by the computing system, cause the computing system to store the instance of the metastructure relationship object datatype in association with the first instance and second instance of the metastructure schema object datatype.

25. The one or more non-transitory computer-readable storage media of claim 23, further comprising:

computer-executable instructions that, when executed by the computing system, cause the computing system to generate a first instance of a metastructure virtual schema object datatype based on the first instance of the metastructure schema object datatype, the metastructure virtual schema object datatype comprising a first data member representing an identifier for a database object represented by the first instance of the metastructure schema object datatype, a second data member representing a database object type associated with the database object, and a third data member representing an identifier for the first instance of the metastructure schema object datatype, wherein the computer-executable instructions that generate the first instance of the metastructure virtual schema object datatype comprise:

computer-executable instructions that, when executed by the computing system, cause the computing system to assign the at least a first identifier of the at least a first database table to the first data member of the first instance;

computer-executable instructions that, when executed by the computing system, cause the computing system to determine that the at least a first identifier of the at least a first database table is associated with a database table;

computer-executable instructions that, when executed by the computing system, cause the computing system to assign a type identifier to the second data member of the first instance indicating that the first instance represents a database table; and computer-executable instructions that, when executed by the computing system, cause the computing system to assign the identifier for the first instance of the metastructure schema object datatype to the third data member; and computer-executable instructions that, when executed by the computing system, cause the computing system to store the first instance of the metastructure virtual schema object datatype in association with the first instance of the metastructure schema object datatype.

26. The one or more non-transitory computer-readable storage media claim 23, wherein the at least a first column in the at least a first database table is associated with a first set of values in the source representation, further comprising:

computer-executable instructions that, when executed by the computing system, cause the computing system to generate an instance of a metastructure value list datatype based on the first set of values, the metastructure value list datatype comprising a first data member representing an identifier for a database object represented by the second instance of the metastructure schema object datatype, and one or more additional data members representing values for the second instance of the metastructure schema object datatype, wherein the computer-executable instructions that generate the instance of the metastructure value list datatype comprise:

computer-executable instructions that, when executed by the computing system, cause the computing system to assign the identifier for the second instance of the metastructure schema object datatype representing the at least a first column to the first data member; and computer-executable instructions that, when executed by the computing system, cause the computing system to assign the first set of values to the one or more additional data members of the instance; and computer-executable instructions that, when executed by the computing system, cause the computing system to store the instance of the metastructure value list datatype in association with the second instance of the metastructure schema object datatype.

27. The one or more non-transitory computer-readable storage media of claim 26, further comprising:

computer-executable instructions that, when executed by the computing system, cause the computing system to generate a first instance of a metastructure data schema datatype based on the source representation, the metastructure data schema datatype comprising a first data member representing an identifier for a data model representation and a second data member representing a data model type associated with the data model representation, wherein the computer-executable instructions that generate the instance of the metastructure data schema datatype comprise:

computer-executable instructions that, when executed by the computing system, cause the computing system to assign a model identifier of the source representation to the first data member of the first instance of the metastructure data schema datatype;

computer-executable instructions that, when executed by the computing system, cause the computing system to determine that the source representation is associated with a database data model; and computer-executable instructions that, when executed by the computing system, cause the computing system to assign a type identifier to the second data member of the first instance of the metastructure data schema datatype indicating that the first instance of the metastructure data schema datatype represents a database; and computer-executable instructions that, when executed by the computing system, cause the computing system to store the instance of the metastructure data schema datatype in association with the first instance and the second instance of the metastructure schema object datatype; and wherein the computer-executable instructions that store the first instance of the metastructure schema object datatype and the second instance of the metastructure schema object datatype in association comprise:

computer-executable instructions that, when executed by the computing system, cause the computing system to store the first instance of the metastructure schema object datatype in association with the first instance of the metastructure data schema datatype; and computer-executable instructions that, when executed by the computing system, cause the computing system to store the second instance of the metastructure schema object datatype in association with the first instance of the metastructure data schema datatype.

* * * * *